United States Patent
Bischel et al.

(10) Patent No.: US 6,208,791 B1
(45) Date of Patent: Mar. 27, 2001

(54) OPTICALLY INTEGRATING PIXEL MICROSTRUCTURE

(75) Inventors: William K. Bischel, Menlo Park; David A.G. Deacon, Los Altos; Nigel J. Cockroft; Markus P. Hehlen, both of Los Gatos; David K. Wagner, San Jose; Richard B. Tompane, Los Altos; Simon J. Field, Palo Alto, all of CA (US)

(73) Assignee: Gemfire Corporation, Palo Alto, CA (US)

( * ) Notice: Subject to any disclaimer, the term of this patent is extended or adjusted under 35 U.S.C. 154(b) by 0 days.

(21) Appl. No.: 09/295,244

(22) Filed: Apr. 19, 1999

(51) Int. Cl.$^7$ ..................................................... G02B 6/10
(52) U.S. Cl. ............................. 385/129; 385/14; 385/15; 385/123; 385/130; 385/131
(58) Field of Search ................................... 385/129–132, 385/123, 4–8, 11–14, 16, 15

(56) References Cited

U.S. PATENT DOCUMENTS

| | | | |
|---|---|---|---|
| 5,009,483 | 4/1991 | Rockwell, III | 350/96.24 |
| 5,055,737 | 10/1991 | Murata et al. | 313/524 |
| 5,097,175 | 3/1992 | Thomas | 313/463 |
| 5,182,787 | 1/1993 | Blonder et al. | 385/131 |
| 5,290,730 | 3/1994 | McFarlane et al. | 437/129 |
| 5,544,268 | * 8/1996 | Bischel et al. | 385/4 |
| 5,647,036 | 7/1997 | Deacon et al. | 385/27 |

OTHER PUBLICATIONS

Shionoya, S., et al., eds., "Phosphor Handbook", CRC Press (1999), Chapter 12, pp. 648–650.
Mita, Y., et al., "Efficient infrared–to–visible conversion in BaY$_2$F$_8$;Yb,Er crystal by confinement of excitation energy", Appl. Phys. Lett., vol. 23, No. 4, Aug. 15, 1973, pp. 173–175.
Mita, Y., et al., "Luminescence processes in Tm$^{3+}$—and Er$^{3+}$–ion–activated, Yb$^{3+}$–ion–sensitized infrared upconversion devices", J. Appl. Phys. 74(7), Oct. 1, 1993, pp. 4703–4709.
Mita, Y., et al., "Generation of Intense Green and Blue Emission in Energy Upconversion Devices Having Optical Confinement Structure", Extended Abstracts of the 1992 International Conference on Solid State Devices and Materials, Tsukuba, 1992, pp. 369–371.
Labsphere, "Integrating Sphere Theory and Applications", Technical Information (1999), pp. 102–116.
Karim, M., Ph.D., "Electro–Optical Devices and Systems", PWS–Kent Publishing Co. (1990), pp. 435–437.
Page, R.H., et al., "Upconversion–pumped luminescence efficiency of rare–earth–doped hosts sensitized with trivalent ytterbium", J. Opt. Soc. Am. B, vol. 15, No. 3 (Mar. 1998), pp. 996–1008.

* cited by examiner

*Primary Examiner*—Phan T. H. Palmer
(74) *Attorney, Agent, or Firm*—Fliesler Dubb Meyer & Lovejoy LLP

(57) ABSTRACT

An integrated optical microstructure includes a substrate carrying an optical waveguide and supporting a medium disposed to receive optical energy from the waveguide. The medium includes an optical re-radiator such as a phosphor, which reradiates optical energy in response to optical energy received from the waveguide. The structure further includes a reflector disposed to redirect some of the input optical energy emanating from the medium back into the medium, to achieve spatial confinement of the input light delivered by the input waveguide. The structure can thereby increase the efficiency of the light conversion processes of re-radiating materials. An aperture in the reflector permits optical energy emitted by the re-radiator to emerge from the structure and to propagate in a preferred direction, such as toward a viewer or sensor. The structure is useful for increasing the brightness of various kinds of small emissive elements which are excited by light delivered from an integrated optical waveguide, including pixels in an information display.

111 Claims, 13 Drawing Sheets

OPTICALLY INTEGRATING PIXEL MICROSTRUCTURE

FIELD OF THE INVENTION

The invention concerns means of improving the optical efficiency of optically excited light emitting structures such as pixels in flat-panel displays.

BACKGROUND OF THE INVENTION

Many commercial emissive display devices generate visible light using electron beam or ultraviolet radiation incident upon a phosphor, such as in cathode ray tube (CRT) or AC plasma visual displays. A less well known display technology, typified in Bischel et al. U.S. Pat. No. 5,544,268, incorporated herein by reference, uses optical waveguides to convey light from a light source onto a display screen. Waveguide-based flat panel displays generally utilize planar and/or channel waveguides. They typically include several parallel channel waveguides to be formed on a substrate. Optical switches are located either in or on the channel waveguides at predetermined matrix locations across the display screen. Optical energy injected into the channel waveguides is extracted at these predetermined positions by the optical switches and directed toward pixel structures which may, in certain embodiments described in the '268 patent, include re-radiators to emit light from the pixel structure towards a viewer. Such reradiators can include out-of-plane reflectors, scattering materials, or luminescent materials which emit at a wavelength which may differ from the wavelength of the input optical energy. Metal reflectors on or near the visible light emitting pixels are used in a variety of ways in different display architectures to redirect visible light emitted by phosphors into a preferred direction to achieve enhanced brightness at the viewer location. For example, Thomas U.S. Pat. No. 5,097,175, incorporated herein by reference, describes a pixel structure for CRT displays, where a material that emits visible light upon excitation with an electron beam is deposited on a transparent substrate in the form of a parabolic shaped cell that is coated with a reflective metal layer to redirect visible light emitted inside the cell through the substrate toward a viewer.

In another example of the use of reflectors to direct light for a visual display, Murata U.S. Pat. No. 5,055,737, incorporated herein by reference, describes a luminescent screen which contains a material that emits visible light when excited by light incident from the viewing direction. This screen contains a reflective structure that redirects light from the emitting material, that otherwise would propagate in undesired directions, back toward the viewer, thereby enhancing brightness.

Thus the conventional function of reflectors used in displays is to direct the light generated in the pixel toward the viewer. Such reflectors do not serve to enhance the efficiency of conversion to visible light of pump energy such as that from an electron beam in a CRT or from the ultra-violet light in a plasma display. Optical performance, including the conversion efficiency, brightness, and chromaticity, of display pixels containing certain optically activated luminescent materials such as phosphors, glasses, or crystals would benefit from increasing the amount of absorbed pump radiation. Therefore a different kind of reflective pixel structure is needed which confines the pump radiation while allowing for the emission of generated light.

SUMMARY OF THE INVENTION

The present invention provides a means of increasing the efficiency of the light conversion processes of re-radiating materials in integrated structures. Roughly described, this is achieved by using a reflective coating deposited on or near the light emitting material to achieve spatial confinement of the input light delivered by an integrated waveguide. The fraction of the input light that contributes to the generation of useful output light is thereby increased. It will be apparent to those skilled in the art that the structures described herein pertain not only to pixels in information displays but more generally to any reflectively enclosed light emitting structure that is optically excited by light from an integrated optical waveguide.

In one embodiment, the optical performance, including conversion efficiency, of an upconversion phosphor contained in such a device is improved by the enhanced absorption of infrared pump light resulting from multiple passes through the absorber by reflection of otherwise unabsorbed pump light off the reflective coating of the confinement structure. Apertures in the reflective coating of the confinement structure allow for the visible light generated in the upconversion process to emerge from the pixel structure and to propagate in a preferred direction, such as toward a viewer or sensor. The efficiency of visible light generation upon infrared excitation of an upconversion phosphor material generally increases as the infrared power absorbed per unit volume is increased, because the probability of non-radiative energy transfer processes involved in the generation of the visible light increases as the average distance between excited optically active ions decreases.

At a fundamental materials level, the invention enables the use of re-radiator materials that have small absorption coefficients for input light due to a small concentration of active dopant ions that absorb light. It is well known that the conversion efficiency of such phosphors often decreases as the concentration of absorbing ions is increased (see "Luminescent Materials", by G. Blasse and B. C. Grabmaier, 1994, incorporated herein by reference). The use of reflectors on a pixel designed to increase the absorption of input light helps ensure utility for such materials that may have low absorption but high conversion efficiency.

The invention provides a means for increasing the brightness of small emissive structures such as pixels in information displays which are excited using light delivered by integrated optical waveguides. The advantage of the invention is significant in the example of an information display where the dimensions of the pixel feature are constrained according to display resolution requirements and the pixel cannot be increased to an arbitrarily large size to achieve larger single pass absorption of input light.

Furthermore, in the case of upconversion phosphor grains in an optically transparent polymer binder, the mixture may comprise phosphor as perhaps only 5% by volume of the total volume enclosed by a pit/mound structure. Confinement of the input light by the reflective surfaces increases the total input light energy that is absorbed per upconversion phosphor particle. The resultant increase in excitation density within the phosphors can provide a higher efficiency of conversion of infrared to visible light within the phosphor grains.

An additional advantage gained from the use of reflectors that confine the pump light delivered to a pixel is that the variation of efficiency with pump light wavelength of a wavelength-converting phosphor, for example, can be reduced. In such a structure, for example, a $NaYF_4$ upconversion phosphor doped with ytterbium and erbium ions having an absorption peak around 977 nm may be pumped at a variety of wavelengths in, say, the 960 nm to 990 nm range and produce comparable green light emission intensity despite a significant variation in the absorption coefficient of the phosphor over that wavelength range. This increase in wavelength tolerance relaxes the specification of lasers used with such a device and can improve device performance uniformity as the wavelengths of pump lasers tend to vary with temperature.

This invention will be better understood upon reference to the following detailed description in connection with the accompanying drawings.

DETAILED DESCRIPTION

Figure 1:
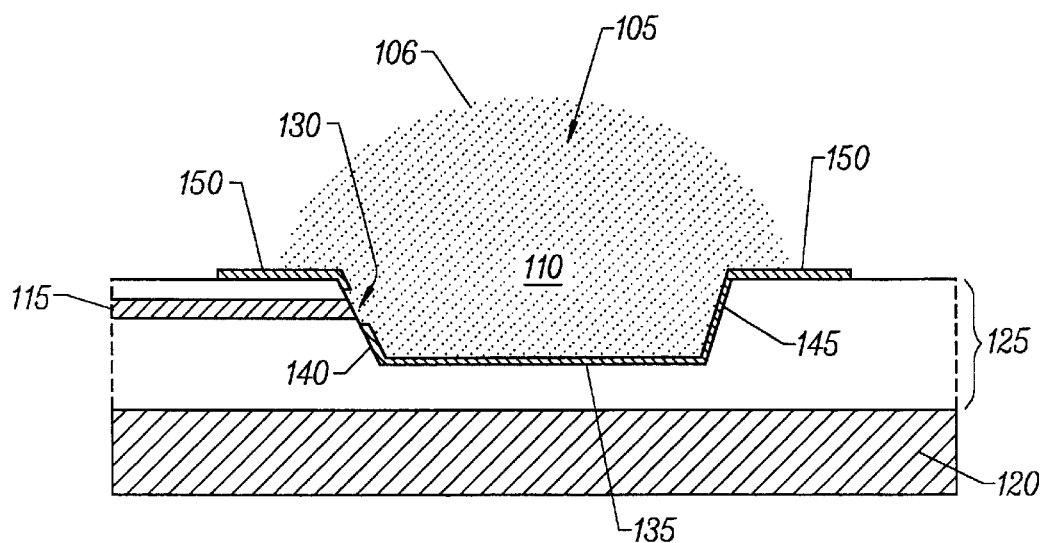
FIG. 1 is a schematic cross-sectional view of a mound of re-radiator material that is deposited in a pit that terminates an optical waveguide integrated on a substrate.

FIG. 1 shows a cross-sectional view of a device comprising a medium 106 which includes a re-radiator material 105 partially located in a pit 110 which terminates an optical waveguide 115 that is integrated in an optical waveguide structure 125 on a substrate 120. The termination of an optical waveguide by the pit is defined as the pit intersecting with and capturing substantially all the light propagating towards the pit in the portion of the integrated optical waveguide that terminates at the pit. Even though the waveguide may not actually meet the pit, the pit may still be able to capture substantially all the light propagating in the waveguide in a downstream direction towards the pit. The optical waveguide structure 125 may be a multilayer stack, or part of the substrate 120 incorporating ion-diffused or ion-exchanged channel or planar waveguides formed from, for instance, titanium, zinc or protons in lithium niobate; silver in glass; or one of many other techniques of waveguide fabrication which are well known in the art. The medium 106 in this example comprises a re-radiator material 105 which protrudes above the top surface of the optical waveguide structure 125 and can be of any shape and may extend laterally beyond the confines of the pit 110 onto the top surface of the waveguide structure 125 or onto any other layer deposited on this top surface of the waveguide structure 125. The medium may be added to the pit by many methods including stencil printing, photolithographic definition, or ink jet printing. A re-radiator material may be any single or multi-component material that alters the properties of input light and from which output light emanates. The input light and the output light emerging may be of single or multiple wavelengths. Generated light is that portion of output light whose wavelength is altered from that of the input light as a result of interaction with the re-radiator. For example, the reradiator material may include a luminescent material (refer to "Luminescent Materials" by Blasse and Grabmaier referenced earlier) or a phosphor that absorbs radiation at wavelengths shorter than the wavelength(s) of emission, henceforth referred to as down-conversion phosphor, or it may include a phosphor that generates light at wavelengths shorter than the input light wavelength at which it is excited, henceforth referred to as an upconversion phosphor. Examples of down-conversion phosphors include $BaMgAl_{10}O_{17}:Eu^{2+}$ and $SrS:Cu^+$. Examples of upconversion phosphors include $BaY_2F_8:Yb^{3+}$, $Tm^{3+}$ and $YF_3:Yb^{3+},Er^{3+}$. The wavelengths referred to above imply the spectral range extending from the far-infrared to the deep UV. Another example of a re-radiator material is a material that scatters input radiation without changing wavelength, in this case there is no generated light.

An integrated optical waveguide 115 is any structure that provides for optical confinement of an input light beam in at least one dimension by careful choice of refractive index of composite materials and appropriate choice of physical dimensions. Examples include planar waveguides or channel waveguides. The parameters necessary to design an optical waveguide structure to guide light at a particular wavelength are well known in the art and may be found for instance in Nishihara et al. "Optical Integrated Circuits," McGraw Hill 1989, incorporated herein by reference in its entirety. The waveguide may be imbedded directly in the interior or top surface of a substrate or may be contained in a layered stack of materials of appropriate refractive index (core and/or top and/or bottom cladding) that is deposited, or otherwise attached, to the top surface of the substrate. It will be apparent that the bottom cladding may be the substrate in a case for example where the waveguide structure is a multilayered stack. A waveguide is considered herein to concentrate optical energy "primarily" within the core of the waveguide, although since evanescent tails extend out into the cladding layers, some energy nevertheless travels outside the core.

The pit 110 may be of any shape that includes a surface that intersects the optical energy from the integrated optical waveguide 115. This surface of intersection includes a waveguide aperture 130 through which input light may be delivered from the integrated optical waveguide 115 into the medium 106 comprising re-radiator material 105. The surfaces of the pit are coated with a reflector 135, 140, 145 such as a multi-layer dielectric film or a layer of a metal such as silver, gold, aluminum or any metal or metallic alloy reflector, or any other material or combination of materials that reflect the input wavelength. Preferably the reflector will exhibit a high degree of reflectivity for at least the input light. The waveguide aperture 130 is at least partially transparent at the wavelength of the input light to allow passage of light launched from the waveguide into the pit. In some cases, this aperture may also provide a means for escape of some of the light re-radiated from the re-radiator material 105.

At least the portion of the top surface of the optical waveguide structure 125 that is underneath the medium of re-radiator material 105 may also be coated with a metallic, dielectric or other reflector 150. Input light delivered to the pit by a waveguide 115 enters the pit 110 through the waveguide aperture 130. Subsequently it propagates through the medium 106 containing re-radiator material 105, undergoing wavelength conversion and/or scattering. Input, scattered or generated light reaching the reflective coatings on the surface of the pit or optical waveguide structure at the base of the medium are reflected back into the medium, to be wavelength converted or to emerge from the top surface of the medium or to escape through the waveguide aperture 130.

Figure 2A:
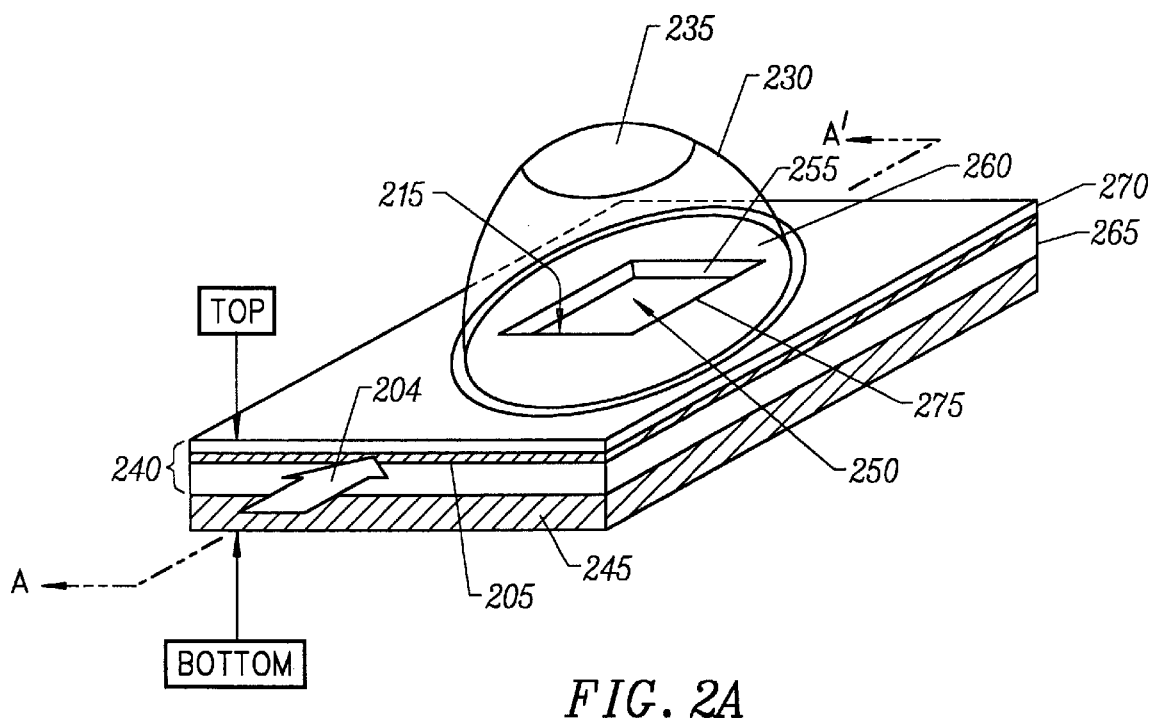
FIGS. 2A, 2B, 3 and 4 illustrate various views of various embodiments that include a mound of re-radiator material superposed by a reflective layer with an aperture, all integrated with an optical waveguide terminated by a pit on a substrate.
Figure 2B:
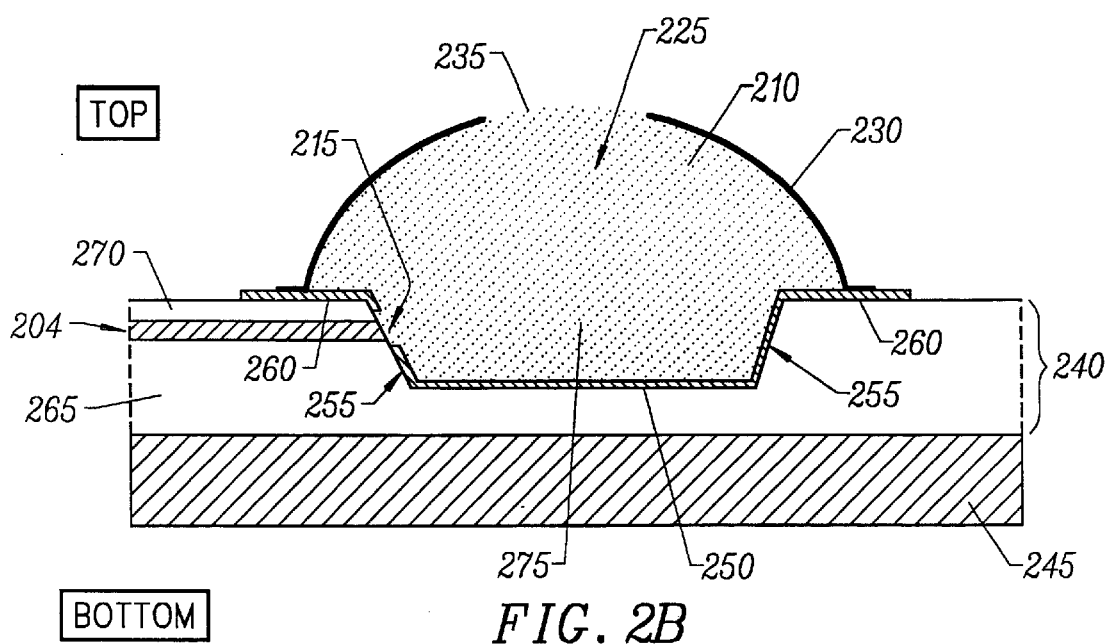

FIGS. 2A and 2B (sometimes referred to herein collectively as "FIG. 2") show a further embodiment of the invention with the addition of an optical reflector structure over part of the top surface of the medium. FIG. 2A is a perspective view of the structure, and FIG. 2B is a cross section in the plane defined by A–A' in FIG. 2A. FIGS. 2A and 2B also indicate the definitions of the bottom side and top side of all the embodiments and their variants shown in the figures hereof, in which it can be seen that all levels are described relative to a substrate at the "bottom" of the structure. The terms above, below, top, bottom and superposition as used herein are not intended to change their meanings if the structure is turned upside down or tilted. In addition, the term "superposition" refers to aboveness, and is not limited to super-adjacency.

The preferred use of the embodiment of FIG. 2 is as an emissive pixel in a visual display, where the medium may comprise, for example, phosphors that generate optical radiation upon excitation with light at a different wavelength as described above. Generated light emitted from the medium is directed towards a viewer, a screen or perhaps an optical scanning device. For an embodiment that uses upconversion phosphor, infrared laser light propagates along an optical beam path 204 in an integrated optical waveguide structure 240, disposed on or integrated directly into a substrate 245, and enters the medium 210 through the waveguide aperture 215. An optical beam path is defined as the direction of propagation of a light beam in a planar or channel waveguide, or in a bulk material. In a display, many pixels (such as any one or more of those described herein) are arranged in an array and are selectively excited with modulated input optical energy to produce an image.

The top surface of the medium 210 is coated with a reflective material 230, henceforth referred to as a top reflector, that may have an optically transmissive aperture 235, henceforth referred to as the top aperture, which allows the emission of light from the structure. The top aperture substantially transmits at least the generated light. The top reflector can be any kind of reflective material including metallic or dielectric coatings that reflects radiation at one or more wavelengths. There may be more than one top aperture in the top reflector and the top aperture(s) may be at any location on the top surface of the medium 210 and have any shape. This allows for the design of the spatial intensity distribution of the output light. Preferably, the top reflector desirably should directly confront the bottom reflectors 250, 255 and 260 disposed on the surfaces of the pit 275 and optical waveguide structure 240, to minimize the number or area of unwanted optical apertures in the device. The top reflector may consist for instance of a multi-layer dielectric coating (as know in the art of optics) which is designed to preferentially reflect the input/pump light and transmit part or all of the generated light. Thus a defined aperture may not be necessary. Equally, the dielectric coating may highly reflect both input/pump and generated wavelengths and the aperture(s) may be formed by a hole in the coating layers at one or more position(s) on the medium. A further arrangement is a combination of the metallic and dielectric reflectors where the metallic reflector may provide the confinement for the generated light and the dielectric coating the confinement for the input light. In this way, an aperture may be opened in the metallic coating to allow emission of the generated light without allowing emission of the input/pump light, as the dielectric coating remains continuous across the surface of the medium.

The presence of the top reflector results in un-wavelength-converted input light emanating from the medium, being reflected back into the medium instead of emerging. This increases the fraction of the input light that is confined to the medium and is available for wavelength conversion and thus increases the amount of generated light produced by the re-radiator medium, compared to the structure of FIG. 1 which has no top reflector. The optical performance of many re-radiator materials will be enhanced through increased absorption in such a structure. For example, input light at 300–400 nm will be absorbed by a re-radiator material comprising $BaMgAl_{10}O_{17}$ doped with divalent europium ions resulting in the efficient generation of light in the 450 nm region. For some materials such as $BaY_2F_8$ doped with trivalent ytterbium and trivalent thulium ions, an upconversion material that has an efficiency of infrared-to-blue conversion that increases super-linearly as the excited ytterbium ion density increases, the increase in the amount of light absorbed in the upconversion particles translates into an increased conversion efficiency per absorbed photon when using the pixel structure of FIG. 2.

In one embodiment, the medium 210 comprises a polymeric binder material, such as an acrylate or epoxy that contains upconversion phosphor particles 225 of, for instance, yttrium fluoride doped with ytterbium and erbium, that absorbs input light of wavelength around 980 nm and converts part of it to shorter wavelengths in the visible spectral region to create red, green, and blue light. As such, the binder material serves several functions including (i) being a host that binds together the upconversion phosphor particles 225 and providing a vehicle for deposition, (ii) providing a means to define a desired shape to the medium 210 and (iii) defining a refractive index boundary between the binder material and the upconversion phosphor which allows design of a specific optical scattering coefficient for the medium 210. In the latter function, for example, a binder can be chosen that has a refractive index that closely matches that of the phosphor material, glass or crystal so that input light and/or output light exhibits essentially no optical scattering. Input light propagates through the medium undergoing scattering and absorption due to interaction with the re-radiator material and undergoing reflection at the top reflector 230 or the reflective coatings 250, 255, and 260 at the base of the medium, until it is absorbed by the phosphor particles 225, or escapes through the top aperture 235, or escapes through the waveguide aperture 215, or is absorbed by any of the reflective coatings, or is absorbed by a residual absorption of the polymeric binder material. Optical absorption of the polymeric binder is preferably very low at the input and generated wavelengths. Preferably the decrease in input light intensity within the medium due to absorption by the upconversion phosphor should dominate other absorption and loss effects, such as due to the binder material and reflector material, in order to maximize the efficiency of emission of useful generated light by the structure. The output light generated by the re-radiator material then propagates through the medium, which preferably should have a small absorption coefficient at this wavelength relative to the absorption coefficient at the input light wavelength, and, after possibly many reflections inside the medium from the reflective coatings, emerges from the top aperture 235, or escapes through the waveguide aperture 215, or is absorbed by the reflective coatings or by the re-radiator or polymeric binder.

Of course, the device of FIG. 2 may contain other re-radiator materials such as downconversion phosphors designed for example to absorb blue light and generate, say, red or green light. Alternatively, the re-radiator material may comprise a material that scatters light but does not have a significant absorption at the wavelength of the input light delivered via the waveguide.

It will be apparent to those skilled in the art that the number, location, and shape of the top apertures 235, the type of reflector material, as well as the type of retomey radiator materials and the spatial distribution of the re-radiator particles 225 in the medium significantly influence the device performance as a pixel for a display application, and that different material choices and/or different applications lead to variations in embodiment. For example, if a reflector material of relatively low reflectivity at the generated light wavelength is used, the top aperture may need to be of larger total area than if a high reflectivity reflector is used so as to minimize cumulative losses at the reflector interface within the device, by minimizing the average number of reflections experienced by a ray of generated light before it escapes through the top aperture.

A device of the type illustrated in FIG. 2 can in one example use as a reradiator an upconversion phosphor doped with ytterbium and erbium ions mixed with a polymeric binder. It can be fabricated by depositing a mound of the medium in a pit that intersects a channel waveguide on a substrate. The mound is cured then coated with a layer of metal to create the top reflector, and a top aperture is created on the top surface. Upon excitation with radiation of wavelength around 980 nm delivered through the waveguide, a four-fold increase in the optical performance (visible power emerging from the top aperture divided by power input into the mound) of the device can be observed relative to a device of similar design without the top reflector metal coating. Other designs will provide either more or less enhancement.

The embodiment of FIGS. 2A and 2B may be fabricated as follows. A planar optical waveguide structure is disposed on the top surface of a substrate material. This structure may consist of a series of separately deposited layers, for instance glasses or UV curing polymers, each with a different refractive index dependent on their position in the structure. For instance, a low index lower cladding layer 265 may be deposited and cured (if necessary) on the substrate surface (for instance by spin/spray/dip coating, slot-die extrusion or vacuum deposition for polymer and spin-on-glass materials, sputtering, evaporation or chemical vapor deposition for hard oxides and glasses).

A waveguide core layer 205 is deposited and cured on top of the lower cladding layer (or alternatively directly on top of the substrate), using a technique compatible with both the core layer and lower cladding materials. The refractive index of the core layer must be greater than that of the lower cladding layer (or the substrate if there is no lower cladding layer), and the combination of the refractive index difference and the core layer thickness should be sufficient to provide optical confinement for at least one transverse mode in the waveguide structure. This combination can readily be computed by a person skilled in the art based on the mathematical waveguide analysis found for instance in the "Optical Integrated Circuits" reference incorporated above. The thickness of the lower cladding layer (if used) should be great enough to ensure that the evanescent field of the guided mode has decayed to substantially zero before it reaches the substrate-lower cladding interface to prevent coupling of light into the substrate and potentially high optical propagation losses.

A channel waveguide, or array of channel waveguides may be disposed over all or part of the planar optical waveguide structure by any of the methods known in the art compatible with the materials system chosen. For instance, for a polymer waveguide system, channel waveguides may be defined by reactive ion etching or laser ablation of the core or cladding layers to provide rib waveguides, photo-definition of the core or cladding layers or by photobleaching. For glass based, or other hard oxide materials (e.g. $SiO_2$), dopants can be incorporated into the core layer (e.g. Ge) and wet or dry (e.g. RIE) etching used to pattern ridge waveguides. Patterned indiffusion of dopants (e.g. metals, Ti, Zn, Ag) into a uniform core layer, or into the surface of the substrate itself can also be used to provide a localized refractive index increase and a channel or planar waveguide structure. Channel waveguide segments may terminate at or upstream of the input waveguide aperture of a pit.

The pattern of channel and planar waveguides may be registered to alignment marks to enable accurate relative placement of the waveguides and the pixel pit structure, and of other features not related to the pit, as necessary. The channel waveguide pattern provides a light distribution structure and may form an optical beam path to deliver light to the pixel structures.

A third layer 270, termed the top cladding or buffer layer, may be disposed over the top surface of the core layer. The function of this layer is to isolate the optical mode in the core of the waveguide from features later deposited on the surface of the device, so that the optical mode propagates in the waveguide structure without interference except at carefully selected locations, such as the pixel pit. The refractive index of the top cladding must be less than that of the core layer, and the combination of the index difference (core-top cladding) and the cladding thickness should be sufficient to cause the evanescent field of the waveguide mode to have decayed substantially to zero before it reaches the top surface of the top cladding layer.

Alternatively, the waveguide can be formed directly in the top surface of the substrate by an indiffusion technique, such as metal indiffusion (e.g. Ti, Zn) in lithium niobate or tantalate, or ion exchange (e.g. Ag) in glass. Other waveguide fabrication methods are well known in the art, and can be tailored for application to different substrate materials. Top cladding (buffer) layers may be applied as described above to protect the waveguide mode from unwanted interference from elements on the top surface of the device, above the cladding layer.

The pit can be formed at pre-selected locations, aligned to the waveguide pattern described above, by one or a combination of several methods. The pit itself can be formed by any of the surface micro-machining or etching methods known in the art which are compatible with the materials used in the waveguide structure construction. For instance, a polymer optical structure may be etched by excimer laser ablation, RIE (Reactive Ion Etching, typically using fluorine based chemistries), or in some instances wet chemical etching. Other optical materials such as glasses and crystals can be etched using broadly the same techniques, but with detailed changes to the etching chemistry, or wavelength in the case of excimer laser ablation, to match the specific properties of the material. The exact parameters of the etch process will depend on the chemistry of the materials used in the waveguide structure. For instance, the wavelength used for laser ablation must be strongly absorbed in the material (e.g. wavelengths around 248nm or 193mn are commonly used), or the RIE process must use the appropriate chemistry to provide volatile by-products which can remove the etched material (e.g. fluorine based gases are often used for etching polymer materials).

The shape and location of the pit can be defined by lithographic masking and patterning processes aligned to the waveguide structures. The depth of the pit may, if desired, vary across the width and length of the pit. The pit may extend completely or partially through the optical waveguide structure, and may even penetrate the substrate. In the embodiment of FIG. 2 the pit cuts through the waveguide core layer in at least one point that intersects the optical path of light propagating in the waveguide structure, such that the waveguide delivers light to the re-radiator material disposed in the pit. For an etch process such as excimer laser ablation, the pit depth may be controlled by applying only a certain number of ablation pulses to the material. The pit shape in the depth direction, (e.g. the angles of the side walls) can be controlled by the detailed process parameters used to perform the etching. For instance with excimer laser ablation, the wall profile may be varied by altering the beam dimension and fluence as a function of etch depth into the structure. Vertical and angled walls (e.g. −45°) can be created in this manner. The base of the pit may be flat or curved as desired for the pixel structure. For instance a curved base to the pit may be used to preferentially reflect generated light directly through the top aperture without undergoing further reflections from the reflector disposed at the surface of the medium. This may decrease the amount of generated light lost to absorption within the medium or on the reflectors, and provide some directionality to the output light emerging from the top aperture. The curved base may be fabricated via laser ablation in a manner analogous to the controlled profile of the pit walls, that is, by changing the laser beam dimension or intensity profile as a function of the depth of the pit, the amount of material ablated by each laser pulse will vary across the pit dimensions, resulting in a non-planar profile to the base.

After etching the pit, a reflective coating is preferably deposited on the surface of the pit structure, for instance by sputtering of a thin metal layer (e.g. Ag), or by the deposition of a multi-layer-dielectric thin-film coating. Lithographic patterning (e.g. photoresist masking followed by a wet chemical etch or RIE, or excimer laser ablation) can be used to remove the reflector from unwanted locations, such as the waveguide aperture where the pit intersects the optical beam path of the waveguide structure. The lithographic pattern used is aligned to the intersection of the optical beam path and the pit so as to form the optically transparent waveguide aperture for delivering light to the medium in the pit.

An alternative fabrication technique may use a directional deposition process such as e-beam evaporation (as opposed to the generally non-directional deposition obtained from a sputtering system) to deposit the reflective coating on the surfaces of the pit. Here, a deposition may be performed whereby the pit is oriented relative to the direction of the deposition source such that the face of the pit containing the waveguide aperture is substantially shadowed from the deposition and remains uncoated with reflective material. This avoids a later lithographic processing of the reflective material in order to define the optically transparent waveguide aperture and align it with the intersection between the optical path and the pit, thus reducing the overall number of steps in the fabrication process and in particular reducing the number of steps that require accurate alignment procedures.

The medium which may for instance comprise an upconversion phosphor mixed with (suspended in) a curable polymer binder, is then deposited into the pit. The binder may be cured by exposure to UV, visible or IR light, by heat, or by evaporation of solvents. The medium comprising the re-radiator material should be chemically compatible with the materials used for the waveguide structure fabrication. The medium may be deposited into the pit by a variety of techniques including, but not limited to, stencil printing, volumetric dispensing with a syringe, inkjet printing or roto-gravure printing. The material (i.e. polymer binder) may then be cured to achieve structural integrity of the medium. The medium may overlie the top surface of the waveguide structure outside of the dimensions of the pit, or it may incompletely fill the pit. No constraint is set as to the shape of the medium in the vertical direction. The shape of the medium in the plane of the waveguide structure may be controlled by the deposition technique, for instance by the volume of medium dispensed from a syringe. Note that for some deposition techniques, additional components such as surfactants or fillers may be required in the binder to achieve uniform deposition. In some manifestations, the binder may comprise inorganic material, such as phosphoric acid or an alkaline metal silicate solution.

In certain embodiments it may be preferable for the pit to be significantly smaller than the medium. In this case the pit can act primarily as an out-of-plane mirror to redirect the input light up into the body of the medium where it interacts with the majority of the re-radiator.

Figure 3:
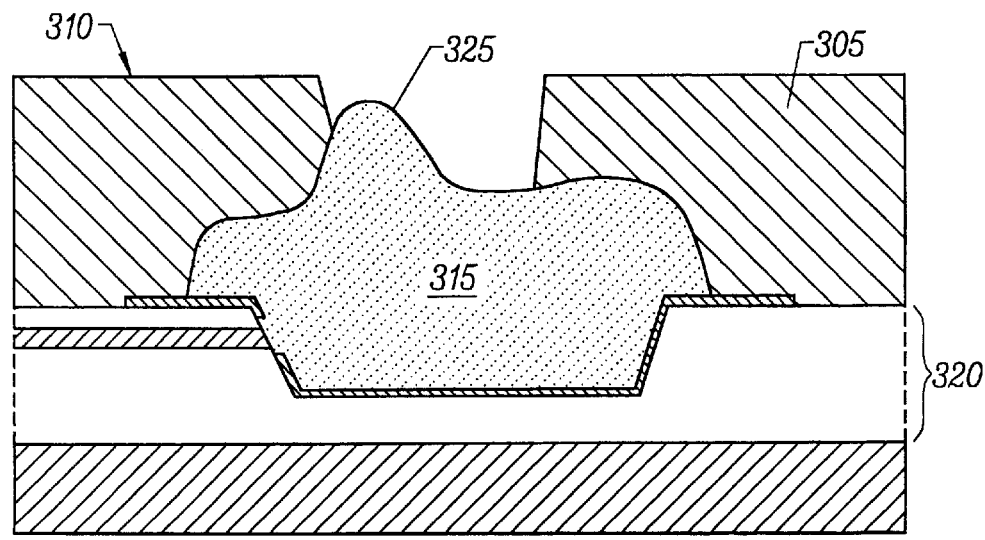

A second reflector is preferably deposited on the top surface of the medium, for instance by the sputter or evaporation of a thin layer of metal (e.g. Ag). Lithographic patterning (e.g. wet etching or laser ablation) may again be performed to remove the reflector from unwanted areas, such as the top aperture on the top surface of the medium, providing an optically transparent emission aperture for output light created by the re-radiator material within the medium. Additionally, other coating methods may be used to apply the reflector, which does not have to be a thin film. The functionality of the reflector is to provide a high reflectivity at the interface between the medium and the reflector. Thus the reflector may be composed of a thin metallic film, but equally it may consist of a thick layer, of for instance solder or silver paste, deposited by dip coating, spray coating or stencil or screen printing, as indicated by reflector 305 in FIG. 3. The reflector 305 could even planarize the top surface 310 of the device, eliminating the surface topography of the medium 315 disposed on the waveguide structure 320. Whatever the form, thickness or material of the reflector, an aperture 325 is preferably created at some position to enable output light to emerge from the medium.

Figure 4:
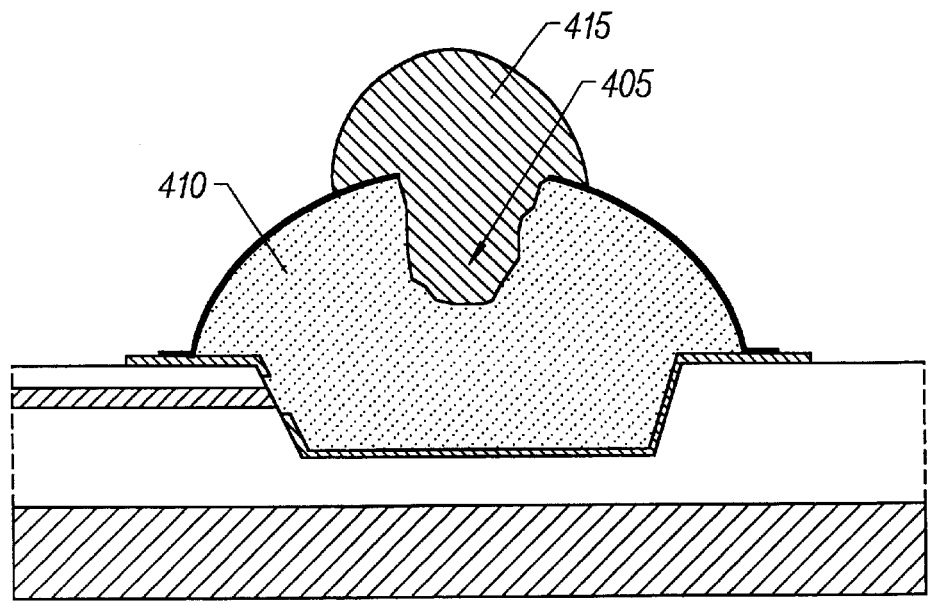

The use of laser ablation to define the top aperture in the reflector also enables the creation of a hole (a depression or a crevice) 405 in the top of the medium 410, as indicated in FIG. 4. This can be created simply by exposing the medium to further pulses from the excimer laser ablation system after the reflective layer has been removed. Provided that the medium 410 absorbs the excimer laser radiation the hole can be ablated in the same way as described above to create the pit. This hole in the top of the medium may be used to enhance the amount of output light emerging from the medium, while maintaining confinement of the input light. In the case of the generated light being of shorter wavelength than the input light, the generated light will be more strongly scattered at the surfaces of the etched hole and thus is more likely to exit the medium through the top aperture in the reflector than is the input light. In addition, a transparent material 415 could be applied to fill the hole thus providing a lensing effect to give directionality to the generated light.

The optical performance of the structures described herein depends on a series of design parameters. For different uses of the structures, different choices for one or more of these parameters may be required to achieve the desired optical performance of the structure. These factors include, but are not limited to, device dimensions, absorption coefficient of the medium, the volume fraction of the re-radiator in the medium, the volume fractions of the phosphor/binder in the re-radiator, reflectivity at pump and generated light wavelengths of the reflectors, divergence of input light from the waveguide as it enters the pit, refractive index mismatch between the phosphor and binder, and the size of the waveguide aperture. The number, size, shape and position of top apertures in the reflector may be optimized for a given set of values for the device dimension and other aforementioned parameters.

One embodiment includes a reflector material with high reflectivity at the wavelengths of both the input and generated light. The size of the input aperture is small compared to the top aperture(s), while still allowing the desired amount of input light to enter through it, in order to minimize input and generated light escaping through the input aperture and to maximize the fraction of generated light that escapes through the top aperture(s). The volume fraction of upconversion phosphor in the polymeric binder (or the re-radiator in the medium) is chosen such that the input light will be substantially absorbed after only a few passes through the re-radiator material. However, the choice of a phosphor volume fraction, for example, depends on the reflectivity of the reflector material. The use of a reflector with high reflectivity allows for more reflections, compared to the use of a reflector with lower reflectivity, for the same total optical loss to the reflector material surfaces, and it therefore allows for a lower phosphor volume fraction. This in turn may require smaller top aperture size(s) in order to maintain confinement of the input light. While the size of the phosphor pit and the aperture may vary significantly in different embodiments, in one example the pit has approximately a 200 micron diameter and the top aperture has a 50 micron diameter. It is apparent to those skilled in the art that achieving the desired function with optimal optical performance involves the optimization of one or more of the aforementioned parameters.

Optical energy emitted by the pixel element has a primary direction of emission, defined by a weighted center of the solid angle of the emission. For display purposes at least, the primary direction of emission should be some direction that is not parallel to the plane of the substrate. Depending on the embodiment, the primary direction of emission might be away from the substrate or through the substrate, and need not be perpendicular to the substrate. A pixel element can also have a second primary direction of emission in certain embodiments, for example where the reflector includes more than one aperture.

In a variation of FIG. 4 an optical fiber may be placed into the hole 405 in the medium 410 in order to capture the output light from the medium. The optical fiber may be glued in place to provide permanent attachment to the medium. In this way the top reflector and fiber assembly may completely enclose the medium, preventing light loss from the medium around the edges of the fiber. Alternatively, a top reflective layer may be applied after the fiber attachment to cover the region around the hole admitting the fiber.

The invention described herein has embodiments other than the preferred form as a visual display pixel. For example the devices of FIGS. 1 or 2 may be used as a light source in a data storage device. Radiation delivered by the waveguide may be reradiated with different wavelength, emerge from the medium towards a collection lens (optional) and be directed onto a data storage medium, such as a hologram or compact disc.

In order to avoid unnecessary repetition, it should be understood that the variations described in reference to FIG. 2 apply to the embodiments described below, and that the variations described in reference to the figures below also apply to FIG. 2.

Figure 5:
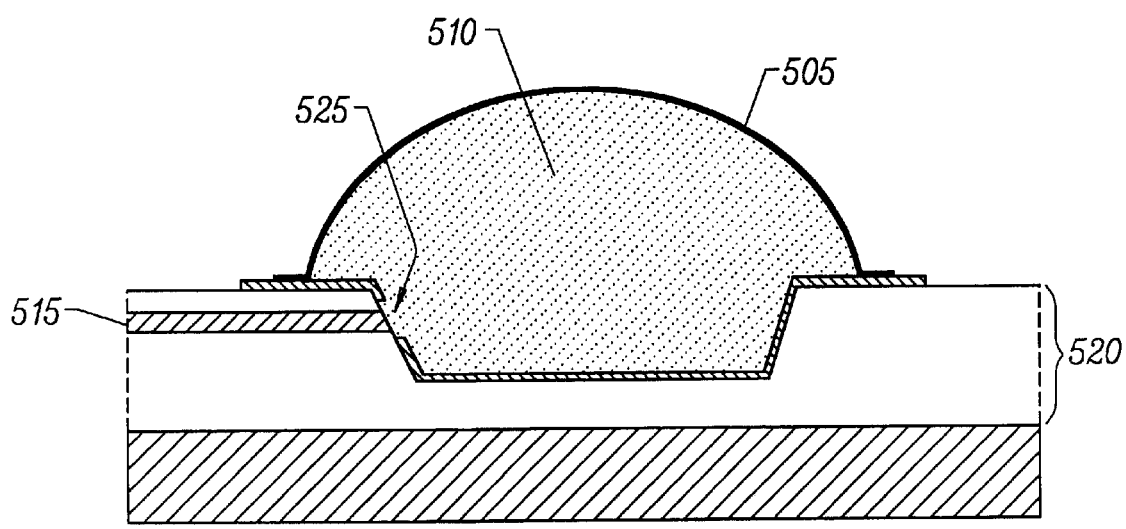
FIG. 5 illustrates an embodiment in which a mound of re-radiator material is completely enclosed by a reflector except for the input aperture.

FIG. 5 indicates an embodiment of the invention where there is no aperture in the top reflector 505 disposed on the medium 510 comprising re-radiator material. Input light propagating along an optical beam path 515 in the optical waveguide structure 520 and entering the medium 510 through the waveguide aperture 525 is confined by reflection in this structure so that the only means for input light and/or output light from the re-radiator material to emerge from the structure is through the waveguide aperture 525. In other embodiments, it may be desired that no light emerge from the waveguide aperture and all the input light may be absorbed.

Figure 6:
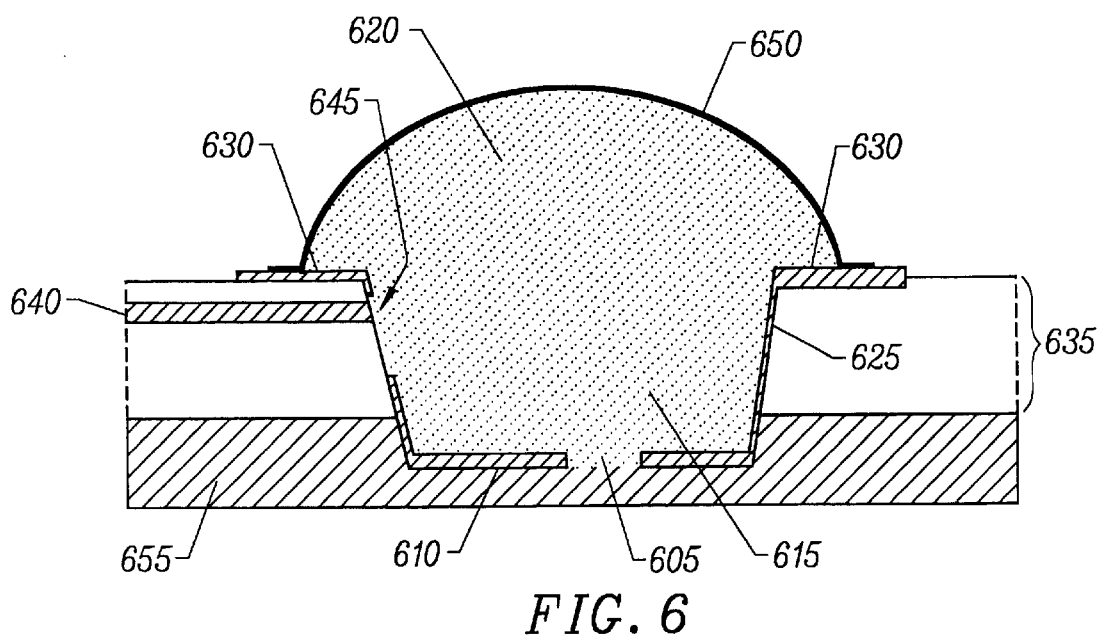
FIG. 6 illustrates an embodiment in which a mound of re-radiator material has a fully reflectively coated top surface and an aperture in a reflective coating at the base of the mound.

FIG. 6 indicates an embodiment of the invention where there is no top aperture, but that contains an optically transmissive aperture 605, henceforth referred to as a bottom aperture, in the reflector 610 disposed on the surface of the pit 615 at the bottom of the medium 620. There may be more than one bottom aperture, and such apertures can be of any shape and at any location on the surface of the pit 615. Alternatively these bottom apertures may be located in the reflector on the side walls 625 of pit 615 and/or in the reflective layer 630 on the top surface of the optical waveguide structure 635. Input light propagates along an optical beam path 640 in the optical waveguide structure and enters the medium 620 through the waveguide aperture 645. The input light is highly confined by the reflector 650 disposed on the surface of the medium 620. Output light can emerge from the medium 620 either through the bottom aperture 605 or the waveguide aperture 645. The presence of the top reflector 650 will increase the efficiency of light re-radiation of the structure by the mechanisms described above, and at the same time provide for propagation of the generated light through the bottom aperture 605, the optical waveguide structure 635, and the substrate 655. This would be the preferred propagation direction in an embodiment of the invention used as a pixel in an emissive display that is viewed through the substrate.

An alternative fabrication of the basic structure of FIG. 6 incorporates a multilayer dielectric coating reflector under the medium, which can be designed to provide high reflectivity at the input light wavelength and to transmit part or all of the generated light. The dielectric coating may be disposed on the bottom surface of the pit, or alternatively may be disposed directly on the substrate before the optical waveguide structure is deposited and patterned, or on some intermediate layer between the substrate and the optical waveguide structure. The dielectric coating may, if desired, be combined with a metallic reflector layer to independently control the reflectivity and emission apertures for the input light and the generated light, to optimize the efficiency of the pixel structure and maximize the emission of the generated light.

In the context of using the device described here as a pixel in an emissive display, a manifestation which incorporates one or more bottom apertures 605 in the bottom reflector 610 along with one or more top apertures 235 (FIG. 2), can provide a structure with apertures on opposing sides of the medium. Such a structure will simultaneously provide high confinement of the input light and increased optical efficiency, compared to a structure with no reflector, and enable an emissive display that can be viewed from both sides of the substrate 655.

Figure 7:
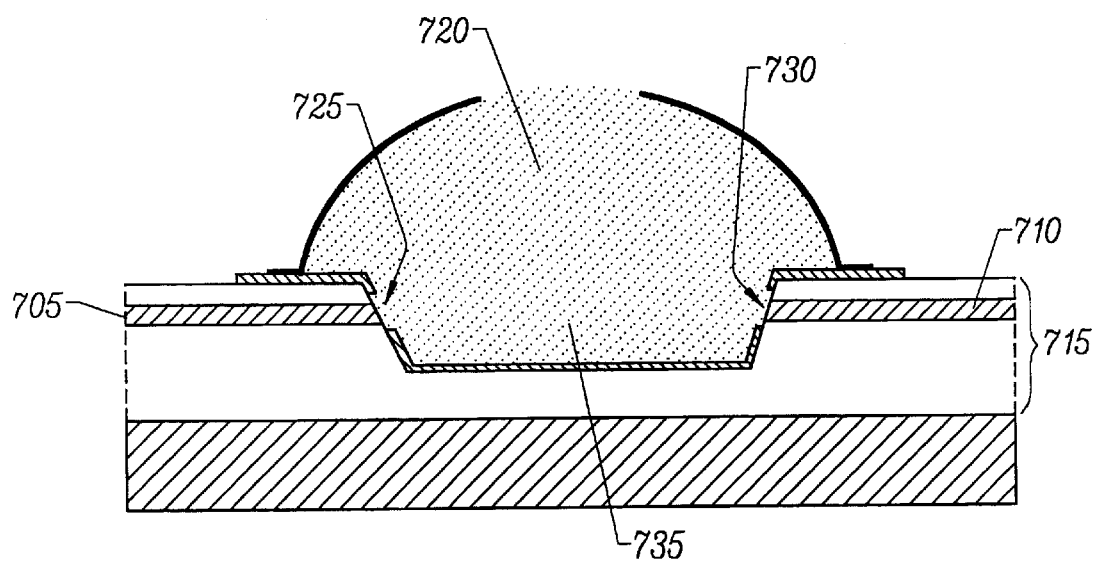
FIG. 7 illustrates an embodiment that uses more than one optical waveguide for light input into and/or output from the re-radiator material.

FIG. 7 indicates a modification that can be applied to any of the embodiments described herein, with two optical beam paths 705, 710 in the optical waveguide structure 715, through which input light can be delivered to the medium 720 through waveguide apertures 725, 730, respectively disposed at the intersection of the pit 735 and the optical beam paths. Output light can also escape through the waveguide apertures 725, 730 into the optical waveguide structure 715. There may be more than two such optical paths terminating at waveguide apertures in the pit 735, and these optical paths may come from any direction in the plane of the optical waveguide structure 715. Light from one or several light sources may be delivered along these optical beam paths to the medium. Thus, this embodiment may provide for further improvement of the optical performance by, for example, delivering additional input light from a second laser source (at the same or different wavelength) through waveguide 710 and waveguide aperture 730 to medium 720 for the purpose of increasing input power to the re-radiator material. This embodiment may also enable the use of two or more different types of input radiation, for example light at different wavelengths, for the purpose of enhancing the efficiency of the desired wavelength conversion process in the re-radiator material.

Figure 8:
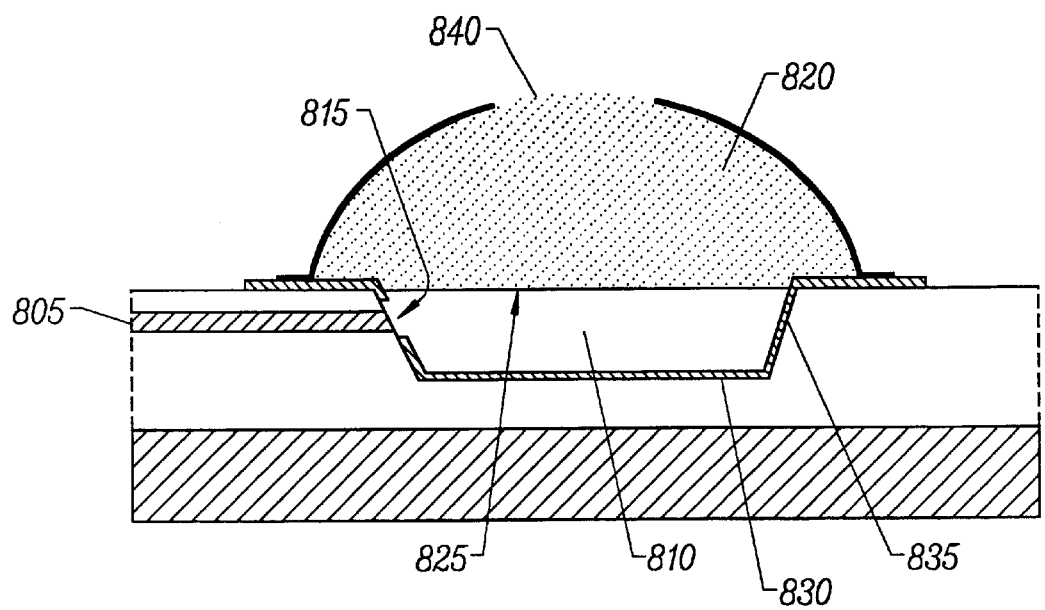
FIGS. 8 and 9 illustrate embodiments in which the re-radiator material is substantially above the level in the pit at which input optical energy is received.

FIG. 8 indicates another modification that can be applied to any of the embodiments described herein and is demonstrated as a variation applied to the device of FIG. 2 as an example. Input light propagating along an optical beam path 805 enters the pit 810 through waveguide aperture 815. In this device, the medium in the pit does not contain only the re-radiator material but rather, as an example, also contains a portion of material that is optically transparent to the input light. In this particular example, the re-radiator is disposed uniformly through only an upper volume of the medium, with substantially no re-radiator in the lower volume of the medium. It will be apparent that the re-radiator may alternatively be "clustered" in a predetermined location within the upper volume of medium or otherwise distributed. Optically transparent is defined as having minimal absorption at the wavelength of input and generated light. This "transparent" material may consist for instance of transparent glass, organic resin, or a gas such as air, and may in particular be the binder material containing no re-radiator material. It will be understood that the term "medium" in this context is intended to include media containing more than one substance, even if the substances are not intermixed, and even if the substances are deposited in different process steps.

The top surface of the transparent material may be above or below the top surface of the optical waveguide structure and is not necessarily planar or flat. Preferably the optically transparent material is disposed adjacent to the waveguide aperture. After entering the pit 810 through the waveguide aperture 815 the input light propagates along the input plane within the optically transparent material without interacting with the re-radiator material, since there is substantially no re-radiator in this input plane. The light may enter the portion of the medium containing the re-radiator material 820 by means of scattering and/or refraction at the interface 825 between the optically transparent material and the re-radiator material 820. The interface 825 may be smooth or rough. If the interface is sufficiently smooth, internal reflection of at least part of the input light may occur as the light traverses the pit. In combination with a reflective surface 830 at the bottom of the pit 810, this allows for the input light to preferentially propagate toward the side of the pit that is opposite the waveguide aperture 815. If the refractive indices of the optically transparent material and the reradiator are chosen correctly (as described in any text on optical waveguide design, see for instance The Optical Integrated Circuits reference incorporated above), the combination of the reflector disposed on the surface of the pit and the interface 825 may act as an optical waveguide. A reflective or diffractive (for instance, a grating) outcoupling element on the distal side wall 835 of the pit may be oriented (e.g. slanted) to direct input light from the pit into the portion of the medium containing the reradiator material 820. Such reflective or refractive outcoupling elements may also be located on the other walls or the bottom of the pit itself.

In an embodiment as a pixel that generates visible light for a display application and where the re-radiator material includes a binder material and/or a wavelength converting material such as an upconversion or downconversion phosphor, the scheme shown in FIG. 8 offers the advantage, relative to the case of FIG. 2, of generating less of the generated light in regions that are close to the waveguide aperture 815. Therefore the generated light has an increased probability of exiting the structure through the top aperture 840 from where it can be directed towards the viewer. The structure of FIG. 8 may also be fabricated using a multilayer thin film dielectric coating (e.g. a multilayer stack of alternating $SiO_2/TiO_2$ layers) as a dichroic filter deposited at the interface 825 to allow input light at a first wavelength to enter the portion of the medium containing the re-radiator material 820 and designed to reflect generated light emitted from the re-radiator material back into the re-radiator material to emerge from the re-radiator through the top aperture 840. This type of interfacial reflector will prevent light generated in the re-radiator material from escaping through the waveguide aperture 815. For example, if the re-radiator material includes an upconversion material such as erbium-doped $YF_3$ that generates green light when excited with infrared light around 1500 nm, 980 nm or 800 nm the interfacial dichroic filter may be designed to transmit the infrared wavelengths and to reflect green light so that the generated green light does not enter the transparent region and then escape through the waveguide aperture.

The structure described above could be fabricated using a two stage deposition process. The pit may be located and fabricated as described above for the embodiment illustrated in FIG. 2. A first deposition step may be used to deposit the optically transparent material into the pit adjacent to the input aperture, the material may over-fill the pit and protrude above the surface and extend out onto the top surface of the optical waveguide structure, or the material may incompletely fill the pit and lie beneath or flush with the top surface of the waveguide structure. The top surface of the optically transparent material is not required to be planar or parallel to the top surface of the optical waveguide structure. This first deposition step could consist for instance of a screen or stencil printing process, or an inkjet or volumetric (via syringe) deposition of the transparent material. The material should then be cured if necessary before a second deposition process, which may be the same or different to the first, is used to add the second layer of material containing the re-radiator. Following curing of the second layer (if necessary) the top surface of the mound may be coated with a reflector as previously described and an aperture created to allow the emission of output light. If desired, a multi-layer dielectric coating may be deposited, by for instance electron-beam evaporation, on the surface of the transparent material before the deposition of the re-radiator medium.

Figure 9:
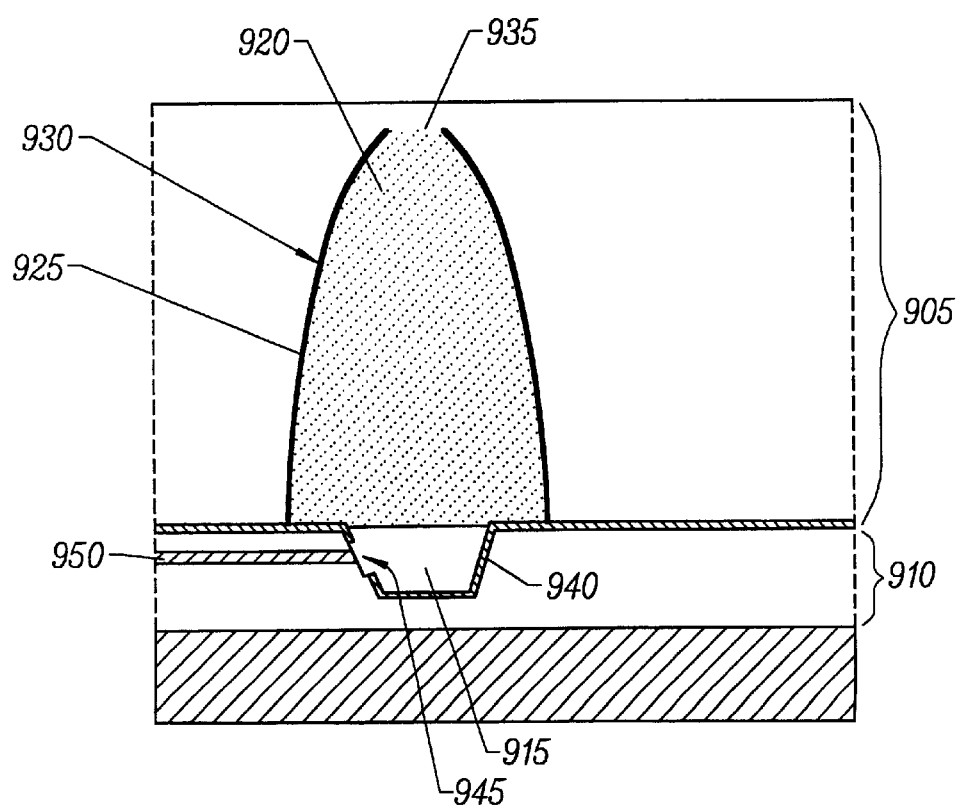

An alternative method of fabrication of the embodiment of FIG. 8 is shown in FIG. 9. Here the upper volume of the medium has been created in a separate layer structure 905 to the optical waveguide structure 910 and then attached (for instance glued or laminated) to the surface of the waveguide structure in alignment to the pit(s) 915 therein. This fabrication route offers the potential for the creation of taller medium 920 structures that offer advantages in terms of single pass absorption efficiency of the input light, minimization of reflection losses on the surface of the medium, and increased directionality of the generated light emission from the top aperture. One route to fabricate the illustrated device would be as follows: A flexible (e.g. Mylar®) (or non flexible) substrate 905 with a thickness preferably greater than the desired height of the medium, is patterned to provide a depression 925 with the desired shape of the medium. This depression could be fabricated by embossing, molding, wet etching, reactive ion etching or excimer laser ablation, depending on the choice of substrate material (at least the latter two processes would be suitable for a plastic (e.g. a Mylar®)substrate). A reflective layer 930 is then disposed on the interior surface of the depression, for instance by the sputtering of a thin metal layer onto the structure. The non-directionality of the sputtering process enables the 3-dimensional surface of the depression to be covered with a continuous layer of material. The reflective layer is then patterned to open an aperture 935 at the bottom of the depression, either using lithographic exposure and wet etching, or more simply by direct material removal using a projection excimer laser ablation system. After patterning the reflector, the medium 920 is deposited into the depression, for instance by screen or stencil printing, or inkjet or volumetric (syringe) deposition. Preferably the deposition process should leave the medium flush with the surface of the substrate or recessed slightly beneath the surface, rather than protruding from the surface of the substrate. The medium filled substrate 905 is then placed over the optical waveguide structure 910 as indicated in FIG. 9 and aligned so that the entrance to the medium filled depression is above the reflector 940 coated pit created in the optical waveguide structure (which may be fabricated as described in the embodiments detailed above). A suitable glue may be disposed between the two substrates, for instance it may be screen printed onto one or the other substrate before they are aligned and brought into contact. The glue may, if desired, form the optically transparent material described above and fill the pit adjacent to the waveguide aperture. Thus, light propagating along an optical beam path 950 within the optical waveguide structure 910 enters the pit through the waveguide aperture 945 and is directed into the medium by the reflector 940 coated pit structure. Output light emerging from the medium is emitted from the top aperture 935 opened in the reflector layer 930 surrounding the medium.

Figure 10:
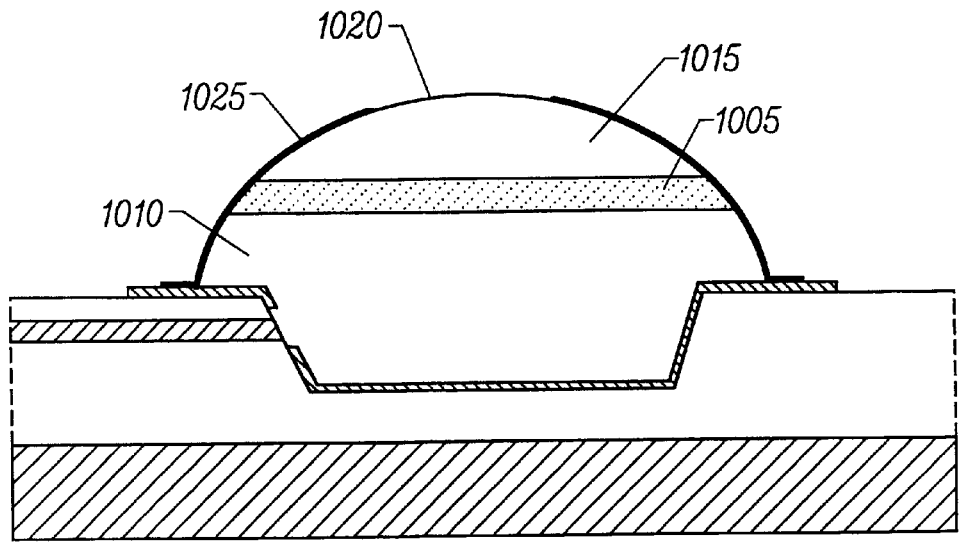
FIGS. 10 and 11 illustrate embodiments in which a re-radiator material is embedded with spatial non-uniformity in a medium also containing other material(s).

FIG. 10 shows an embodiment of FIG. 2 in which the medium comprises a spatially non-uniform distribution of re-radiator material 1005, such as upconversion phosphor particles in a binder material, disposed between two optically transparent materials 1010 and 1015 (which may or may not be same material). The re-radiator may be placed in a particular location in the structure for several reasons. For example, the re-radiator may be more efficient if concentrated in a region within the structure where the input light excitation density is higher than at other locations in the medium. Alternatively, the re-radiator material 1005 may be preferentially located close to the top aperture 1020 where the generated light can more directly exit the top aperture 1020 in the top reflector 1025 thereby requiring fewer reflections from the reflective coatings before exit. A further embodiment may comprise a re-radiator material that itself comprises a spatially non-uniform distribution of phosphor particles for the reasons explained above.

Several methods may create a spatially non-uniform distribution of re-radiator in the medium. For example, an optically transparent polymeric binder material might first be deposited by stencil printing, ink jet printing or spin coating, and a second material comprising, for example a polymeric binder containing upconversion phosphor might be stencil printed on top of the first layer. If desired, additional optically transparent material may be deposited on top of the re-radiator material and part or all of the structure may be covered with reflector.

Of course, the spatial nonuniformity of re-radiator is not restricted to the use of layers or to the use of one type of re-radiator. For example, two or more small mounds of different re-radiator materials may for example, be deposited in a pit and an additional material may be deposited over the combination of re-radiator mounds. A reflector may be deposited over the entire structure. The reflector will ensure good absorption of light by the appropriate re-radiators. Multiple layers of materials, or small mounds of different re-radiator materials may be deposited serially in a sequence of deposition steps. For instance, screen or stencil printing and curing of the underlying transparent layer may be followed by individual volumetric depositions (or inkjet or stencil prints) to create layers or mounds of re-radiator materials, followed by a final deposition of transparent material to cap the re-radiator material.

FIG. 10 also demonstrates that the structure may, if desired, contain only a small volume of one component and a larger volume of a second. For example, the upconversion phosphor particles in the re-radiator 1005 may occupy only a small fraction, say 5% of the total volume of the medium. Confinement of the input light by the reflective surfaces thereby increases the total input light energy that is absorbed per upconversion phosphor particle. The resultant increase in excitation density within the phosphors will provide a higher efficiency of conversion of infrared to visible light within the phosphor particles. This enhancement will occur whether the phosphor particles are distributed evenly, as a small volume fraction, or unevenly.

It is also within the scope of the invention to utilize a specific shape to the medium and therefore the top reflector 1025 to create, by reflection, localized regions of higher intensity of light within the medium. Preferably the shape will maximize the intensity of input radiation at the same spatial location as the re-radiator material thus maximizing the excitation density and efficiency of the re-radiation process. Suitable shapes to perform this function would include parabolic profiles, or generally concave reflection surfaces.

Figure 11:
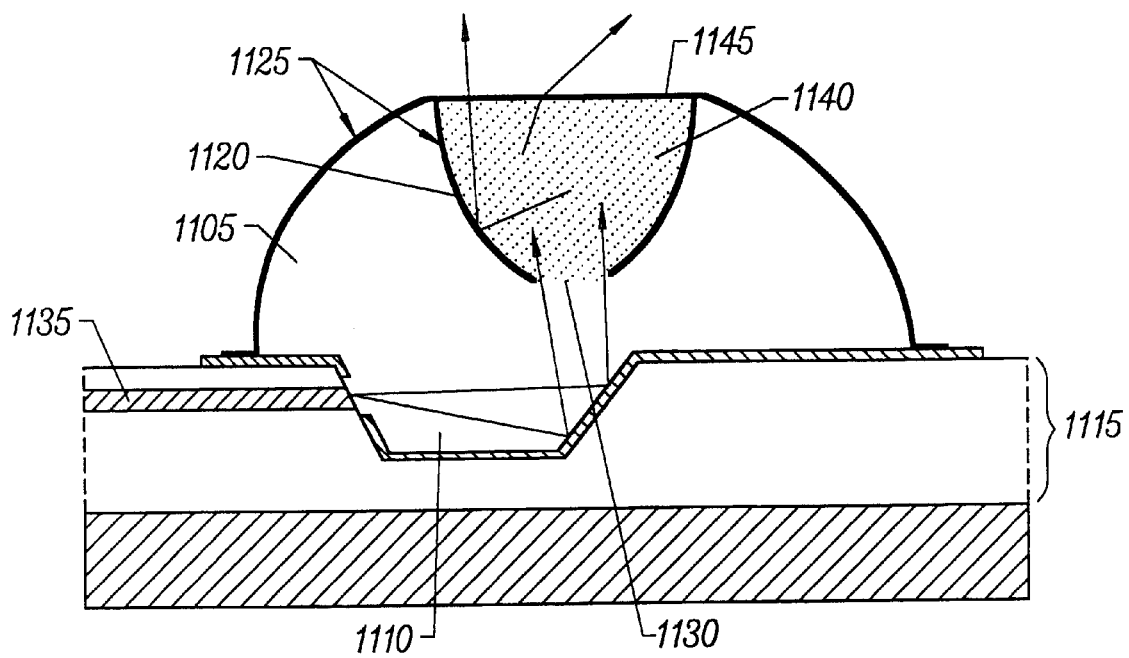

FIG. 11 shows a further embodiment of the invention using multiple depositions of different materials to create a mound of optical re-radiator in a medium.

In this case a portion of optically transparent material 1105 is deposited and cured (if necessary) over and in the reflector coated pit 1110 formed in the optical waveguide structure 1115 (fabricated as described in the embodiments above). A depression 1120 is created in the top surface of the optically transparent material, for instance using excimer laser ablation or reactive ion etching to remove material from a desired area.

The shape/profile of the depression may be controlled during the etch process as described for the embodiment of FIG. 2, leading preferably to a parabolic or near parabolic shape. Following the etching of the depression, a reflective layer 1125 is deposited over the mound of optically transparent material, and an aperture 1130 is opened as described above. The aperture should preferably be aligned relative to the reflector coated pit in the optical waveguide structure, such that input light from an optical beam path 1135 within the optical waveguide structure 1 115 enters the pit 1110 and is redirected through the aperture. Re-radiator material 1140 is deposited into the depression formed in the top surface of the mound of optically transparent material, superposing the reflector layer, using any of the deposition methods previously described. The re-radiator material may protrude above the top surface of the transparent material, or it may be flush with or recessed below the top surface. Preferably, a multilayer dielectric mirror 1145 (e.g. a stack of alternating layers of $SiO_2$ and $TiO_2$) is deposited over the top surface of the mound of re-radiator to preferentially reflect the input light and transmit light generated within the re-radiator.

Figure 12:
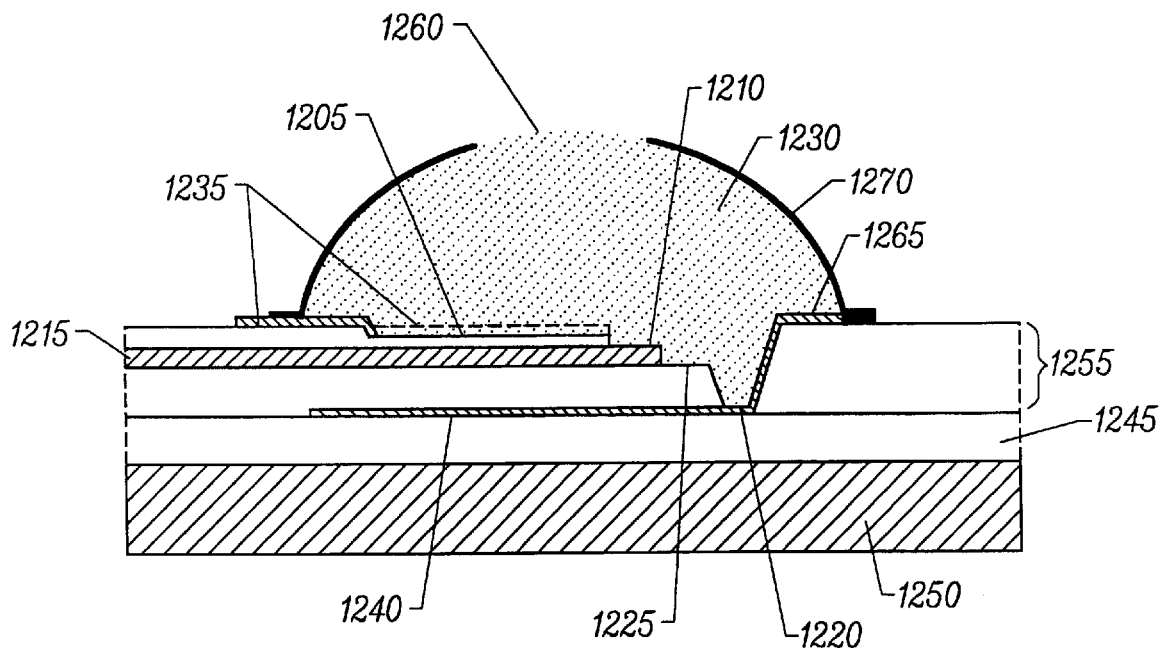
FIG. 12 illustrates an embodiment in which the core layer of the input optical waveguide extends into a mound of medium containing a re-radiator material.

FIG. 12 shows a structure which enables the design of a controlled delivery of input light to desired locations in the medium. At least part of the bottom of the pit 1205 does not extend further down than to the plane defined by the top surface 1210 of the integrated optical waveguide core 1215, and at least another part of the bottom of the pit 1220 extends at least as far down as the plane defined by the bottom surface 1225 of the integrated optical waveguide core 1215. As a result, the optical waveguide core layer 1215 may extend partially into the medium 1230 and input light propagating through the optical waveguide core 1215 may be only partially confined within the waveguide core and may outcouple from the waveguide into the medium 1230. Optionally, a reflective coating 1235, such as a metallic or dielectric reflector, may be deposited onto the surface of the pit 1205 in the section where the waveguide extends into the medium 1230.

Alternatively or additionally a metallic or dielectric reflector 1240 may be disposed directly on the surface of the substrate, or on some intermediate layer 1245 between the substrate 1250 and the optical waveguide structure 1255, before the deposition of the optical waveguide structure. This reflector layer can be designed to reflect one or both of the input light and generated light that emerges from the medium towards the substrate back into the medium for emission through the top aperture 1260. The pit may extend from the top surface of the optical waveguide structure 1255 completely through the structure to reach the reflector disposed beneath the structure, such that a reflector 1265 disposed on the side walls of the pit abuts the reflector 1240 on the substrate leaving substantially no area for light to escape the medium at this location.

Such a structure may be fabricated by several methods including the following multi-step process. Firstly, a lithographically defined etch technique is used to create a pit that extends into the top surface of the waveguide structure as described above. A multi-step etch process may be used to vary the depth of the pit at different locations, for instance using two lithographic masking steps for an RIE process, or using two different projection exposure masks for a laser ablation etch. The two masks used must of course be correctly aligned to ensure the desired overlap of the different depth regions of the pit. Deposition and patterning of a reflective layer 1235, 1265 on the bottom and side surfaces of the pit may be performed for instance by sputter coating and wet etching of a thin film metal layer. The medium 1230 may be deposited into the pit by any of the techniques previously described, and the top surface of the medium coated with a reflector 1270 and provided with a top emission aperture as previously described. Thus the structure of FIG. 12 may be created, with an initial region where the pit is etched only partially into the upper cladding or core layer, followed by a second section where the pit extends deeper, to completely remove the core layer in at least one location within the pit.

Figure 13A:
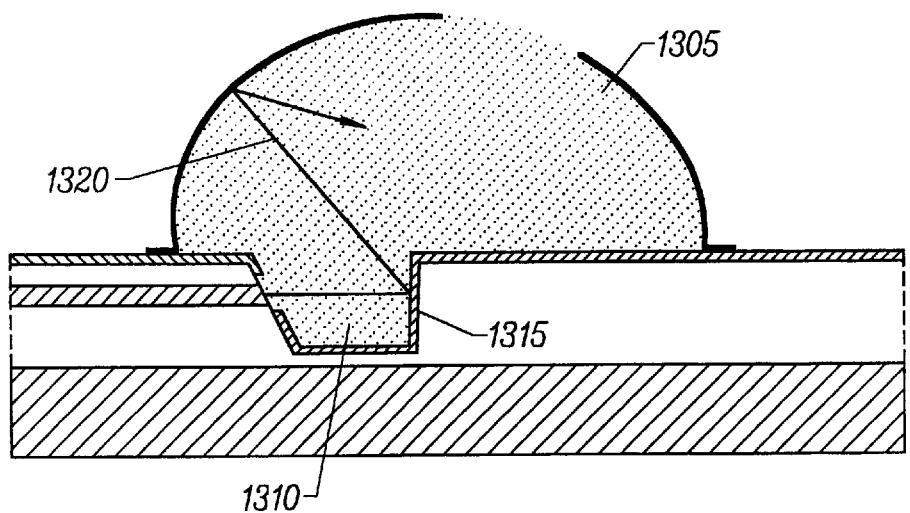
FIGS. 13–15 illustrate other embodiments including offset pits, half-filled pits and more than one pit.
Figure 13B:
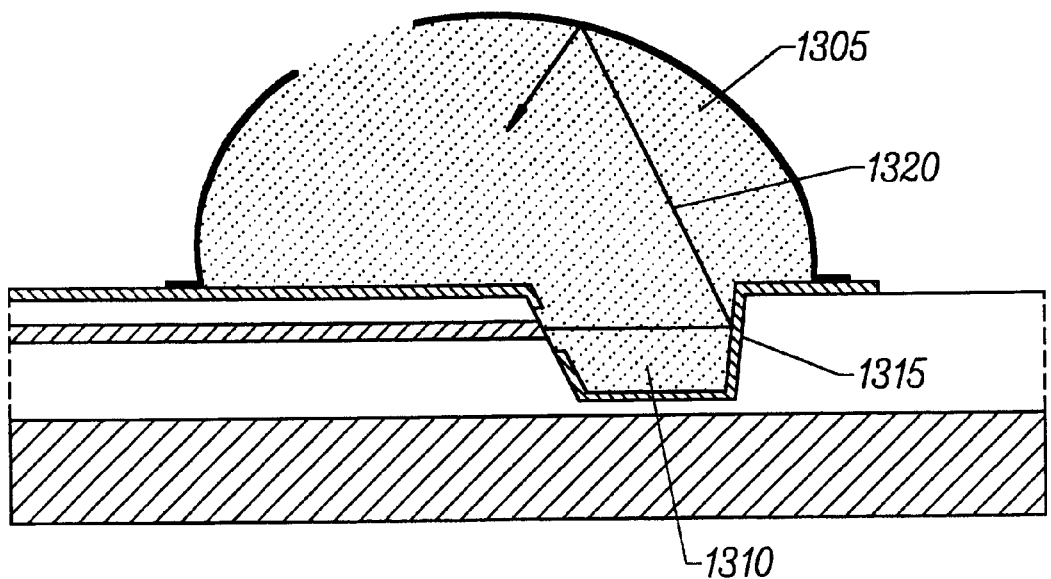
Figure 14:
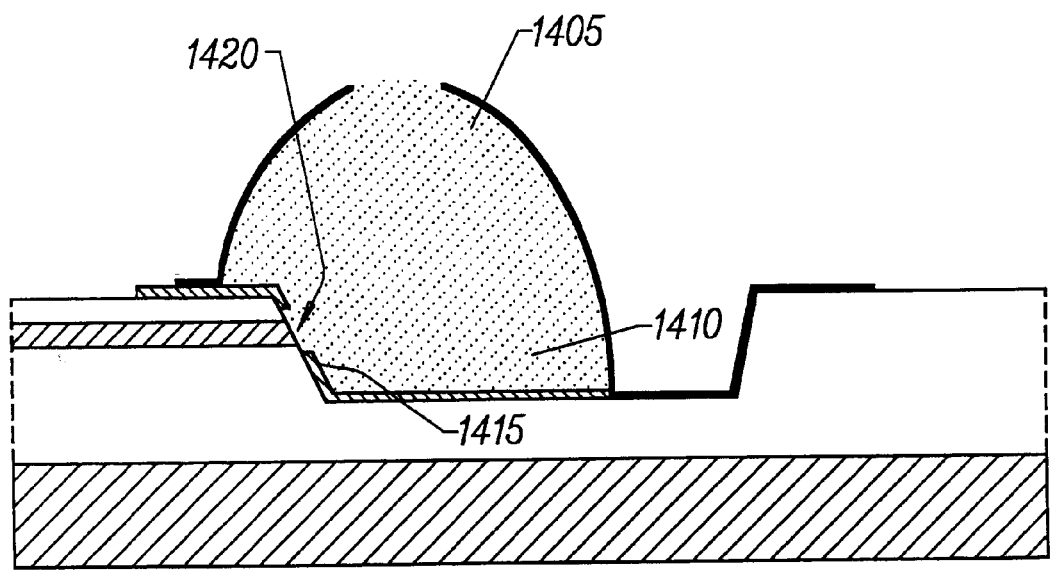

Additionally, FIGS. 13A and 13B show an alternative technique for controlling the delivery position of input light to desired locations in the medium 1305. In these embodiments, the medium 1305 is positioned off center from the pit 1310. By controlling the relative positions of the medium, input aperture and distal reflecting surface 1315, the path of input light 1320 can be controlled within the medium. Thus it is possible to preferentially direct the input light towards the front, center or back of the medium (and similarly in the lateral dimension not shown in the cross-sectional FIGS. 13A and 13B). As shown in FIG. 14 a further embodiment is such that the medium 1405 does not superpose all the surfaces of the pit 1410 but at least superposes the input face 1415 comprising the input aperture 1420.

Figure 15:
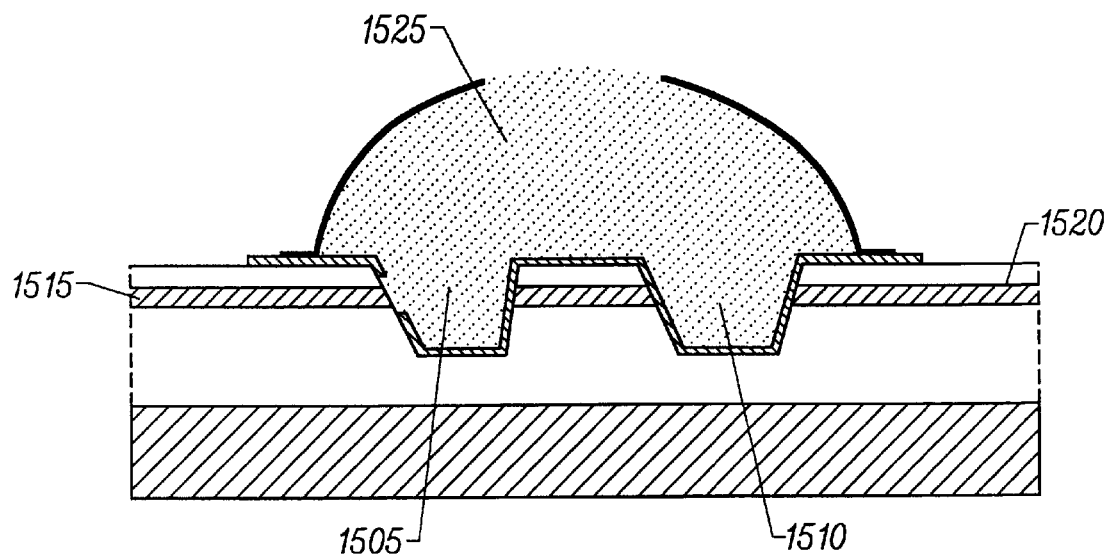

Note that in all the embodiments described above there is no limitation on the relative dimensions of the pit and the medium. In certain embodiments it may be preferable for the pit to be significantly smaller than the medium such as in FIG. 13A. In this case the pit 1310 can act as an out-of-plane mirror to redirect the input light up into the body of the medium where it interacts with the majority of the re-radiator. In addition, consider the case of FIG. 15 in crossectional view where at least two pits 1505 and 1510 are disposed to deliver input light propagating in one or more optical beam paths 1515, 1520 to a common medium 1525.

Figure 16:
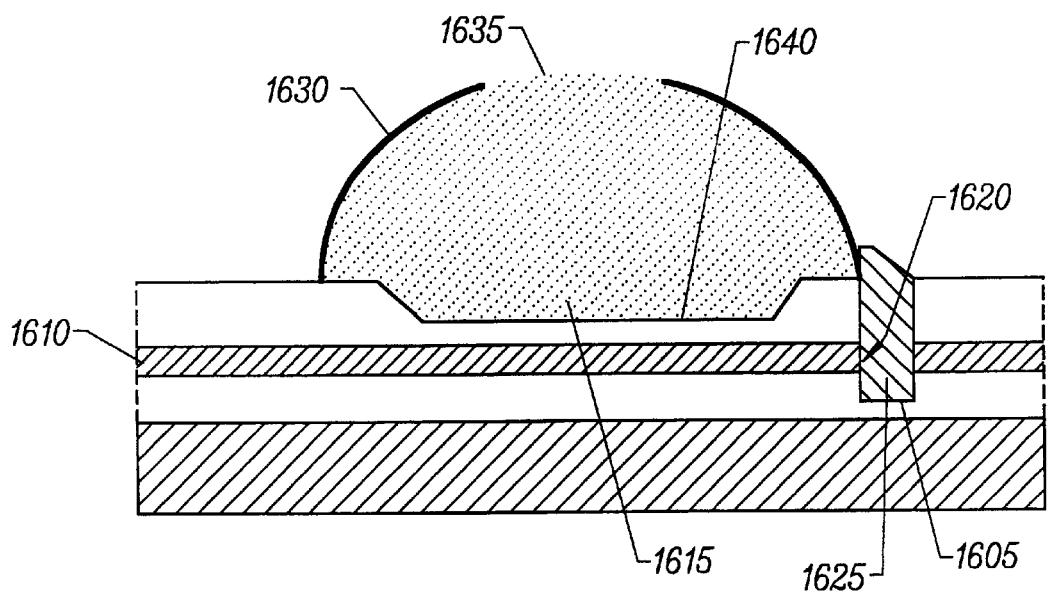
FIGS. 16 and 17 illustrate embodiments in which the medium containing the reradiator material is disposed in a separate well allowing it to interact with the evanescent field of the input light.
Figure 17:
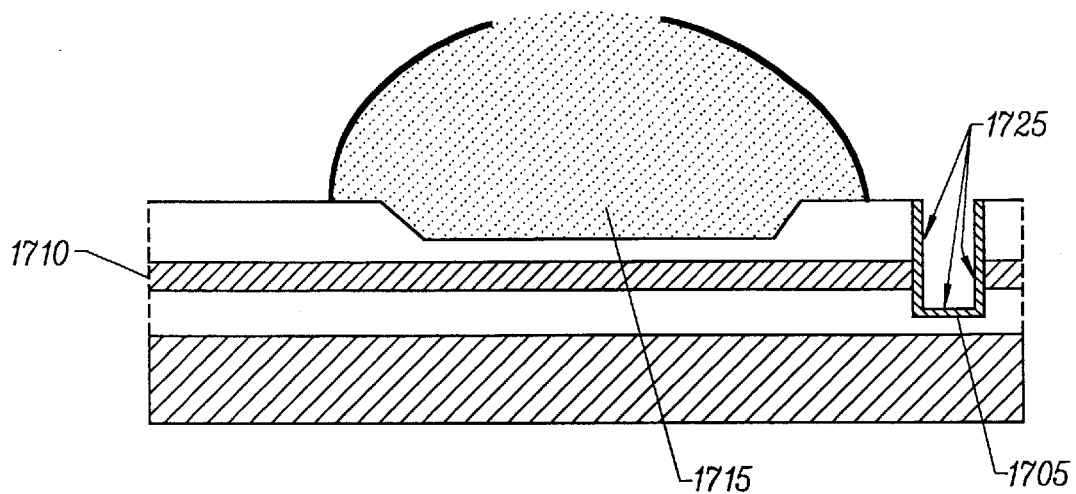

FIGS. 16 and 17 indicate embodiments in which the pit (1605 in FIG. 16 and 1705 in FIG. 17) that terminates the optical energy path from the waveguide 1610, 1710 does not also support the medium containing the optical re-radiator. Instead the medium is supported in a well (1615 in FIG. 16 and 1715 in FIG. 17) substantially above the waveguide core, but close enough to the core such that input light energy propagating within the waveguide is transferred to the medium by evanescent coupling. The term "well", as used herein, does not itself imply any particular depth relative to the core layer. Optimizing evanescent coupling enables the design of distributed energy delivery into the re-radiator material. The separation between the bottom surface of the well and the core of the waveguide is determined by a combination of the following parameters: the desired strength of evanescent coupling, and the difference in refractive indices between the medium or the re-radiator material and the core and top cladding layer materials of the waveguide structure. The closer the well approaches the waveguide core, the stronger the optical coupling.

In FIG. 16, the pit 1605 which intersects the optical beam path of light propagating within the waveguide core 1610 extends below the waveguide core at a surface 1620. The pit 1705 in FIG. 17 similarly extends below the waveguide core 1710 and intersects the optical beam path of the core 1710. A reflector 1725 may be deposited on the intersecting surface as shown in FIG. 17, and/or, as shown in FIG. 16, an absorber material 1625 may be deposited within the pit 1605 to prevent further propagation of light along the intersected optical path. An optical absorber material is one that is opaque to light of at least the wavelength of the input light and optionally the generated light. Note that if a reflector is disposed on the surfaces of the pit 1605 or 1705, then the pit 1605 or 1705 may in some embodiments be filled, or partly filled, with re-radiator material (rather than optical absorber) and may be enclosed by the top reflector surmounting the medium.

In the particular embodiment of FIG. 16 an optional reflector 1630 with an top aperture 1635 is shown disposed on the top surface of the medium. Additionally, a dielectric reflector may be disposed on the bottom surface 1640 of the well 1615 which allows the evanescent transfer from the waveguide to the medium but substantially reflects light generated by the re-radiator material into a direction away from the waveguide core. Alternatively a metallic or dielectric reflector may be disposed directly on the surface of the substrate, or on some intermediate layer between the substrate and the optical waveguide structure, before the deposition of the optical waveguide structure. This reflector layer can be designed to reflect one or both of the input light and generated light that emerges from the medium towards the substrate, back into the medium before emerging from the top aperture.

Figure 18A:
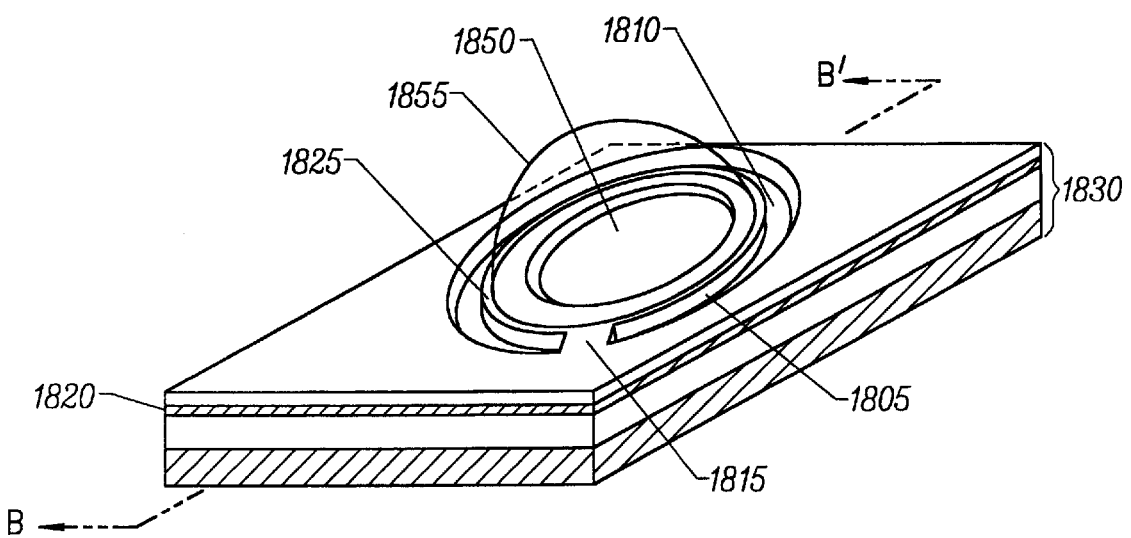
FIGS. 18A–C illustrate various views of an embodiment of a device based on the structure shown in FIG. 17.
Figure 18B:
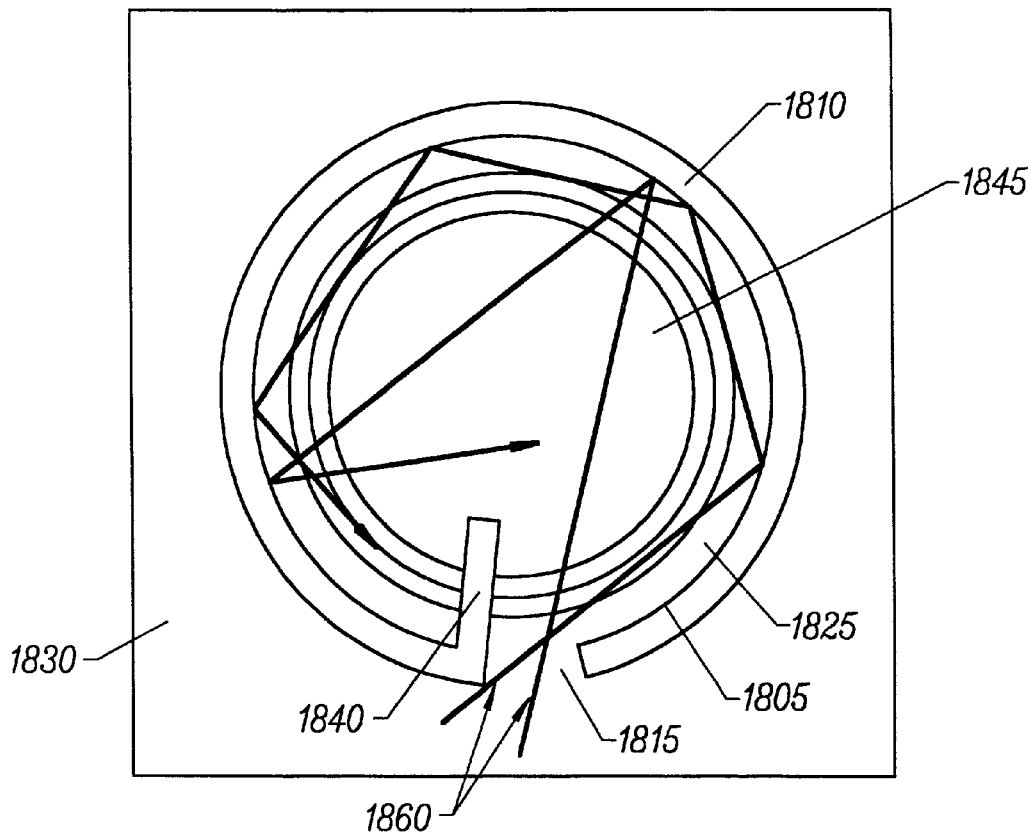
Figure 18C:
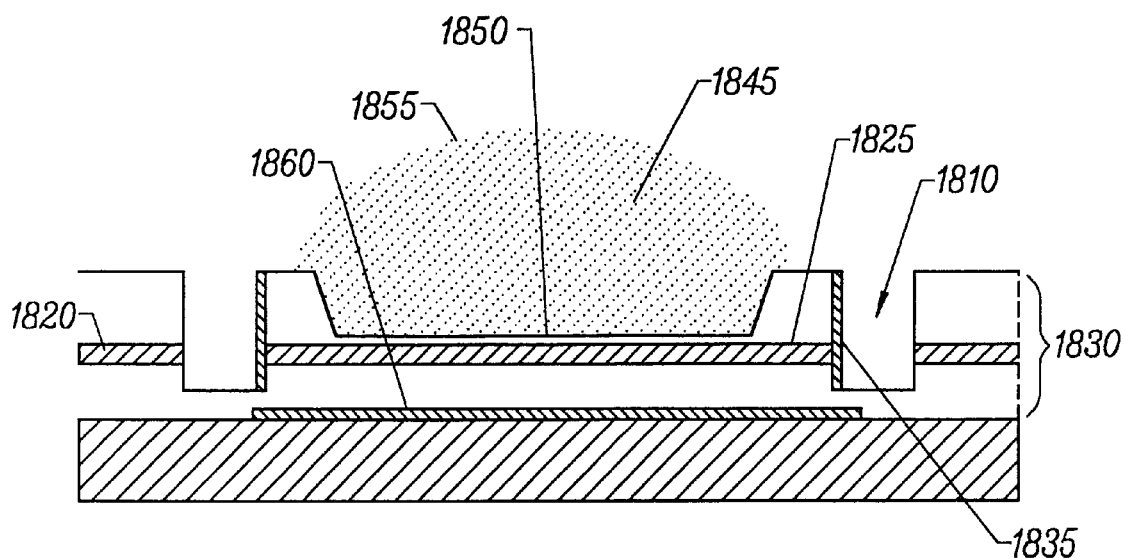

A further embodiment based on the structure shown in FIG. 17 and described above is shown in FIGS. 18A, 18B, and 18C. FIG. 18A is a perspective view, FIG. 18B is a top view, and FIG. 18C is a cross section in the plane defined by B–B' in FIG. 18A. In this embodiment, as shown in FIG. 18A, the core termination surface 1805 of a pit 1810 describes a generally circular shape (a sidewall or an enclosing shape) that leaves at least one section 1815 open for the delivery of input light along an optical beam path in the waveguide 1820 to the region 1825 of the waveguide that is bounded by the core termination surface 1805; we henceforth refer to this open section 1815 as the input aperture. There may be more than one input aperture and the core termination surface 1805 of the pit may describe any shape in the optical waveguide structure 1830 for example an oval, quadrilateral or any other polygonal shape and, optionally, may be coated with a reflector 1835. We henceforth refer to the area bounded by the core termination section as the confinement region 1825. The core termination surface 1805 may have a shape that minimizes the amount of input light that propagates in the confinement region 1825, escaping through the input aperture 1815, thereby maximizing the fraction of input light that is confined to the confinement region by the core termination surface. This is achieved, for example, by a section of the core termination surface 1805 acting as a baffle 1840 as shown in FIG. 18B. A well 1845 is located above the waveguide core layer in the confinement region 1825. The evanescent interaction section 1850 of the well 1845 is that portion of the well 1845 that is disposed above the waveguide core layer with a sufficiently thin top cladding layer such that light is coupled from the waveguide into the superposing medium 1855 by an evanescent coupling method. Deposited on top of the evanescent interaction section 1850 is a medium 1855. Optionally, a reflector may be added to the top surface of the medium 1855. Additionally or alternatively, a reflector 1860 may be added on the substrate or any surface between the substrate and the bottom surface of the core layer 1820.

As shown by the rays 1860 in FIG. 18B, input light propagating in the core layer 1820 and entering the input aperture 1815, undergoes multiple reflections at the core termination surface 1805 and propagates in the plane of the waveguide core layer within the confinement region until it is coupled into the medium 1855 comprising reradiator material by the evanescent interaction, or escapes through the input aperture 1815, or is absorbed by the reflective coatings. Adjustment of the thickness or refractive index of the top cladding layer in the evanescent interaction region 1850 allows for control of the interaction process that couples input light into the re-radiator material. In an embodiment of FIGS. 18A–18C where the re-radiator material contains upconversion phosphor, the evanescent interaction achieved by this device, for example, may allow for a very uniform excitation of upconversion phosphor particles near the surface 1850. Output light generated by the upconversion phosphor particles in the medium can then emerge from the structure and, in the context of using the structure as a pixel in emissive displays, provide for a uniform emission pixel on the display screen.

Figure 19:
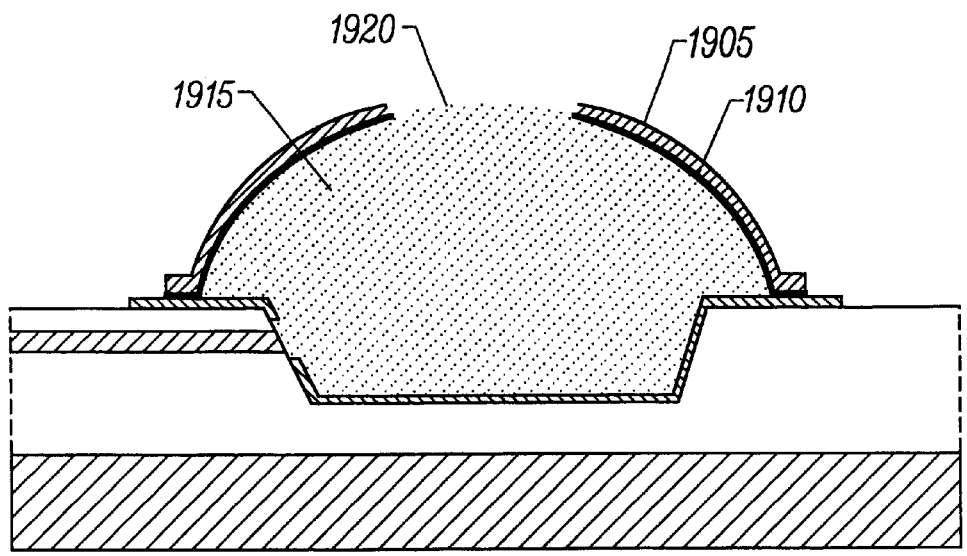
FIG. 19 illustrates an embodiment of the present invention incorporating a black matrix layer.

For applications of any of the embodiments of the invention as pixels in emissive displays, it may be desirable to deposit a black material in the regions from which no light is emitted from the screen. One purpose of this so-called black matrix material is to absorb ambient light incident on the viewing area of the display and thereby to prevent ambient light reflected off the screen toward the viewer from reducing the contrast ratio of pixels on the display. FIG. 19 is an embodiment of the invention where a layer of black material 1905 is deposited on top of the top reflector 1910 on the medium 1915. This embodiment provides coverage of non-emissive areas with black material. In different embodiments these non-emissive areas could include just the reflector-coated top surface of the medium 1915 or the entire top surface of the device except the optically transmissive top apertures 1920 on the medium, or any other portion of the device top surface. In one mode, the black material is deposited after the deposition of the reflective material of the top reflector 1910 and before patterning of the top aperture 1920. An etching or ablation technique, such as laser-ablation, can then be used to remove the black material and the reflective material on the medium in order to create an optically clear aperture 1920 in a single manufacturing step.

The black material may be deposited for instance by evaporating or sputtering an optically opaque (black) material after depositing the reflective layer, or the black material may consist of for instance a polymer binder material including a dye such as Sudan black or carbon black particles, and be deposited by screen or stencil printing, inkjet printing or spray or dip coating Note that the aperture in the black material may be larger than that formed in the reflective layer such that not all the reflective layer is covered by black material. Alternatively, the black material may be deposited and patterned if necessary after the aperture has been formed in the reflective layer. In this case the aperture in the black material may be smaller than, the same size as or larger than the aperture in the reflective layer.

Figure 20:
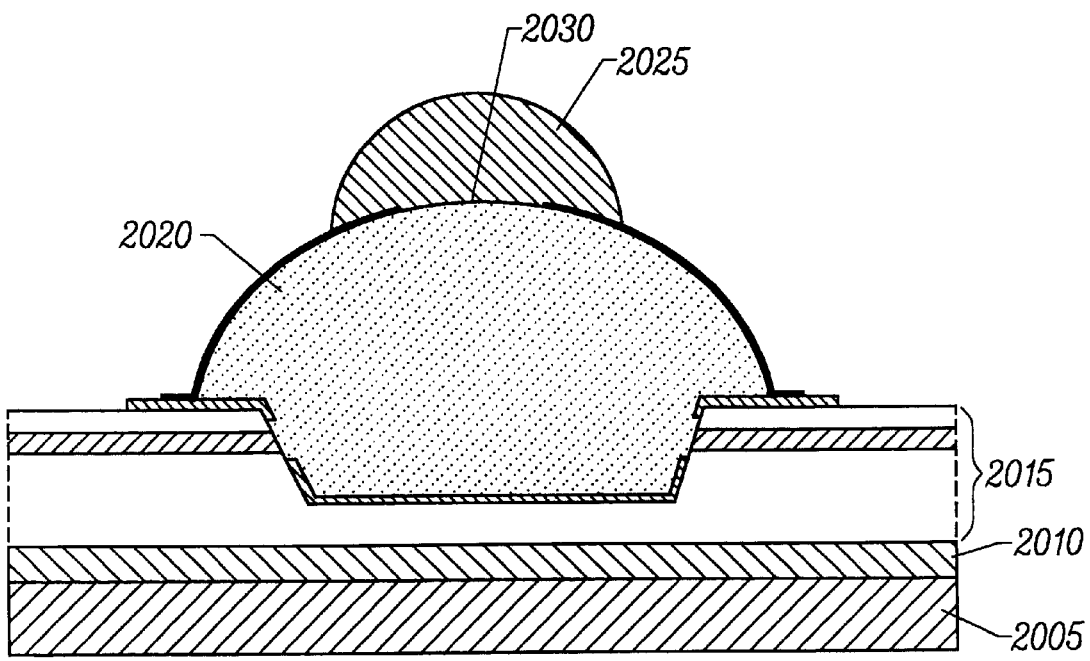
FIGS. 20 and 21 illustrate other embodiments incorporating alternative black matrix layers and output lenses.
Figure 21:
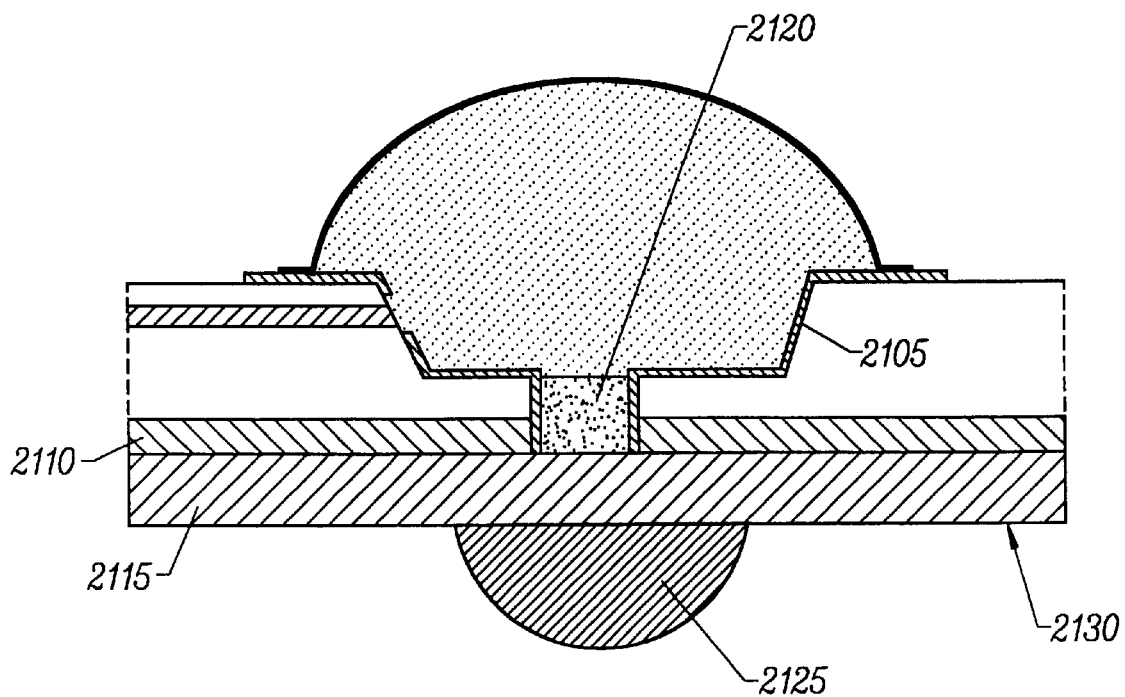

A further embodiment, shown in FIG. 20 allows for a simplified deposition process of the black matrix by coating the substrate 2005 with a layer of black material 2010 prior to creating the various optical layers of the optical waveguide structure 2015 and the components of the medium 2020. Alternatively the black material may be deposited on some intermediate layer between the substrate and the optical waveguide structure. FIG. 21 shows a further embodiment where the optically transmissive aperture is created in the bottom surface of the medium through the reflector 2105 and black material layers 2110. In this embodiment, generated light is emitted through the substrate 2115.

In a further embodiment, a layer of material may be added to a substantially planar medium in order to create an optically smooth layer. If the refractive indices of the materials are appropriately chosen it is possible to achieve a degree of optical confinement within the multilayer structure as a result of total internal reflection at the smooth top surface of the structure. In this way the input light can be confined within the medium until it is absorbed, without the requirement to add a further, highly reflective, layer over the top surface of the medium. A smooth layer may be created for instance by depositing a layer using one of the techniques previously described, where the material can undergo reflow to remove any surface topology induced by the deposition process or the underlying layer. Following reflow the layer should preferably be cured to provide a robust surface. A true reflow process may not be required to achieve the aim of this embodiment. The deposition of a low viscosity material will result in a substantial smoothing of the surface topology of an underlying layer as the low viscosity material is able to flow away from the high points and into any depressions that may be present. The degree of planarization achieved will be determined by a combination of the roughness of the underlying layers and the flow properties of the upper layer. It will be appreciated that there is a limit to the minimum material viscosity that can be used before the material simply flows over the entire surface of the structure.

As shown in FIG. 20, an appropriately shaped lens element 2025 may be attached to the medium 2020 above the top aperture 2030. This lens will serve to control the direction and core angle of light emitted from the device towards a viewer or other sensor. Such a lens element may comprise for instance, a stencil printed or inkjet printed transparent epoxy in a three-dimensional ellipsoidal shape. Similarly, as shown in FIG. 21, for any embodiment comprising a lower aperture 2120, such a lens 2125 may be added to the substrate lower surface 2130.

Unless otherwise specified, the term "substantially" is used herein to accommodate tolerances including manufacturing tolerances and optical tolerances (for example, dielectric reflectors physically can not reflect light at all angles). Omission of the word "substantially", however, should not be taken to require that such tolerances are not to be accommodated, since no real-world manufacturing process can be perfect.

As used herein, the term "optical energy" is intended to include energy extending from far infrared to deep ultraviolet wavelengths.

As used herein, a given event is "responsive" to a predecessor event if the predecessor event influenced the given event. If there is an intervening processing element, step or time period, the given event can still be "responsive" to the predecessor event. If the intervening processing element or step combines more than one event, the signal output of the processing element or step is considered "responsive" to each of the event inputs. "Dependency" of a given event upon another event is defined similarly.

The specific embodiments of the invention described herein are intended to be illustrative only, and many other variations and modifications may be made thereto in accordance with the principles of the invention. All such embodiments and variations and modifications thereof are considered to be within the scope of the invention, as defined in the following claims.

What is claimed is:

1. Optical apparatus comprising:
   a material having a pit;
   an integrated optical waveguide in said material, said waveguide having a core layer having top and bottom depths in said material and said pit extending at least down to said bottom depth of said core layer, said pit being disposed to receive optical energy from said waveguide;
   a medium disposed at least partially in at least part of said pit and including an optical re-radiator, said optical re-radiator re-radiating optical energy in response to optical energy received from said waveguide; and
   a reflector disposed to redirect at least a portion of optical energy emanating from said medium back into said medium.

2. Apparatus according to claim 1, wherein said waveguide further has a top cladding layer above said core layer, wherein said top cladding layer terminates at or upstream of said pit, and wherein said core layer extends into said pit.

3. Apparatus according to claim 2, wherein said core layer terminates part-way across said pit.

4. Apparatus according to claim 1, wherein said re-radiator in said medium is disposed at least partially above said top depth of said core layer.

5. Apparatus according to claim 4, wherein said waveguide further has a top cladding layer having a top depth and wherein said re-radiator in said medium is disposed entirely above said top depth of said top cladding layer.

6. Apparatus according to claim 4, wherein said medium includes a top volume superposing substantially all of said re-radiator in said medium.

7. Apparatus according to claim 4, wherein said medium consists of a lower volume disposed in said pit and an upper volume disposed above said top depth of said top cladding layer, and wherein said re-radiator is disposed entirely and uniformly in said upper volume.

8. Apparatus according to claim 4, wherein said medium includes an upper volume disposed above said top depth of said top cladding layer, and wherein said re-radiator is concentrated within a predetermined volume which is smaller than and entirely within said upper volume.

9. Apparatus according to claim 8, wherein said predetermined volume is less than 5% of the volume of said medium.

10. Apparatus according to claim 8, wherein said reflector is shaped to redirect, preferentially toward said predetermined volume, optical energy from said waveguide which is emanating from said medium.

11. Apparatus according to claim 1, wherein said medium has a top surface, and wherein said reflector includes a top portion at least partially covering said top surface of said medium.

12. Apparatus according to claim 11, wherein said top portion of said reflector is dome-shaped.

13. Apparatus according to claim 11, wherein said top portion of said reflector includes a top aperture transmissive to optical energy re-radiated by said reradiator.

14. Apparatus according to claim 13, further comprising black matrix material superposing regions of said top portion of said reflector.

15. Apparatus according to claim 13, wherein said pit has a bottom surface and said reflector includes a bottom portion at least partially covering said bottom surface of said pit below said medium, said bottom portion of said reflector including a bottom aperture transmissive to optical energy re-radiated by said re-radiator.

16. Apparatus according to claim 11, wherein said pit has a bottom surface and said reflector includes a bottom portion at least partially covering said bottom surface of said pit below said medium.

17. Apparatus according to claim 1, wherein said pit has a bottom surface and said reflector includes a bottom portion at least partially covering said bottom surface of said pit below said medium.

18. Apparatus according to claim 17, wherein said bottom portion of said reflector includes a bottom aperture transmissive to optical energy re-radiated by said re-radiator.

19. Apparatus according to claim 1, wherein said reflector includes a first aperture through which said pit receives optical energy from said waveguide, and further includes a second aperture, different from said first aperture, which is transmissive to optical energy re-radiated by said re-radiator.

20. Apparatus according to claim 19, further comprising an output waveguide disposed to receive optical energy transmitted through said second aperture.

21. Apparatus according to claim 1, wherein said reflector comprises a reflector material which is at least partially transmissive to optical energy re-radiated by said re-radiator.

22. Apparatus according to claim 1, wherein said optical energy received by said pit from said waveguide propagates along a path in an input plane, wherein said reflector includes an input aperture through which said pit receives said optical energy from said waveguide, and further includes a sidewall portion on a wall of said pit opposite said input aperture, said sidewall portion being disposed and oriented to reflect optical energy received by said pit through said input aperture, out of said input plane and toward said re-radiator.

23. Apparatus according to claim 22, wherein said medium contains substantially no re-radiator in said input plane.

24. Apparatus according to claim 1, wherein said optical energy received by said pit from said waveguide is concentrated primarily in an input plane parallel to said core layer of said waveguide, wherein said reflector includes a sidewall substantially perpendicular to said input plane and forming an intersection with said input plane which substantially surrounds said pit.

25. Apparatus according to claim 24, wherein said pit includes a raised region substantially surrounded by said side wall and underlying at least part of said medium, said raised region having a core layer with the same top and bottom depths as the core layer of said waveguide.

26. Apparatus according to claim 25, wherein said sidewall forms a circle having an input aperture through which said optical energy from said waveguide passes, said optical energy from said waveguide entering said circle with a primary propagation direction that is off-center with respect to said circle.

27. Apparatus according to claim 26, further comprising a baffle reflector portion disposed and oriented to reduce optical energy emission back out through said input aperture.

28. Apparatus according to claim 25, wherein said waveguide further has a top cladding layer above the core layer of said waveguide, wherein said raised region further comprises a top cladding layer above said core layer and below said medium, said top cladding layer being thinner than the top cladding layer of said waveguide.

29. Apparatus according to claim 28, wherein said top cladding layer in said pit is sufficiently thin to permit evanescent coupling of optical energy out of said core layer and into said medium in said pit.

30. Apparatus according to claim 1, wherein said reflector redirects into said medium substantially all optical energy which reaches said reflector from said waveguide.

31. Apparatus according to claim 1, wherein said re-radiator comprises a luminescent substance.

32. Apparatus according to claim 1, wherein said re-radiator comprises an upconversion phosphor.

33. Apparatus according to claim 1, wherein said re-radiator comprises a medium consisting of scattering centers.

34. Apparatus according to claim 1, wherein said reflector includes an input aperture through which said pit receives optical energy from said waveguide, said medium superposing at least said input aperture.

35. Apparatus according to claim 1, wherein said reflector has a single aperture through which said pit receives optical energy from said waveguide, and through which optical energy generated by said re-radiator escapes said pit.

36. Apparatus according to claim 1, wherein said material further comprises a second pit, said medium further being disposed at least partially in said second pit.

37. Apparatus according to claim 1, comprising a first optical path through which said pit receives optical energy from said waveguide, further comprising a second optical path through which said pit receives optical energy not from said waveguide.

38. Apparatus according to claim 1, further comprising a lens disposed to refract optical energy re-radiated by said re-radiator.

39. Apparatus according to claim 1, further comprising a further reflector disposed below at least part of said core layer.

40. Apparatus comprising:
   a substrate carrying an optical waveguide and supporting a medium disposed to receive optical energy from said waveguide, said medium including an optical reradiator which re-radiates optical energy in response to optical energy received from said waveguide; and
   a reflector disposed to redirect a first portion of optical energy emanating from said medium back into said medium, at least a second portion of optical energy reradiated by said optical re-radiator being permitted to escape said medium primarily in a direction not parallel to said substrate.

41. Apparatus according to claim 40, wherein said integrated optical waveguide has a top cladding layer and a core layer below said top cladding layer, said core layer having top and bottom depths in said substrate and wherein said medium is at least partly disposed in at least part of a pit, at least part of said pit extending down at least to said bottom depth of said core layer.

42. Apparatus according to claim 41, wherein said top cladding layer terminates at or upstream of said pit, and wherein said core layer extends into said pit.

43. Apparatus according to claim 42, wherein said core layer terminates at a partial distance across said pit.

44. Apparatus according to claim 41, wherein said optical energy from said waveguide is received into said pit from an input aperture in a sidewall of said pit, wherein said reflector includes a sidewall portion disposed on a sidewall of said pit opposite said input aperture, said sidewall portion being disposed and oriented to reflect optical energy received from said input aperture toward said re-radiator.

45. Apparatus according to claim 44, wherein substantially all of the reradiator in said medium is disposed at a depth in said medium which is above the optical energy path from said input aperture to said sidewall portion of said reflector.

46. Apparatus according to claim 40, wherein said substrate has a top surface, wherein said reflector includes a sidewall portion substantially perpendicular to said substrate top surface and substantially surrounding an underlying confinement region below said re-radiator in said medium, said sidewall portion having an input aperture for receiving optical energy from said waveguide.

47. Apparatus according to claim 46, wherein said sidewall portion forms a circle having said input aperture therein, said optical energy from said waveguide entering said confinement region with a propagation direction that is off-center with respect to said circle.

48. Apparatus according to claim 46, wherein said reflector further comprises a baffle portion disposed and oriented to reduce optical energy emission from said confinement region back through said input aperture.

49. Apparatus according to claim 46, further comprising an optical core material in said confinement region below said re-radiator, and a cladding material superposing said optical core material within said confinement region and below said re-radiator.

50. Apparatus according to claim 49, wherein said cladding material is sufficiently thin to permit evanescent coupling of optical energy out of said optical core material and into said medium.

51. Apparatus according to claim 40, wherein said medium has a top surface, and wherein said reflector includes a top portion at least partially covering said top surface of said medium.

52. Apparatus according to claim 51, wherein said top portion of said reflector is dome-shaped.

53. Apparatus according to claim 51, wherein said top portion of said reflector includes a top aperture transmissive to optical energy re-radiated by said reradiator, said second portion of optical energy escaping said medium through said top aperture.

54. Apparatus according to claim 53, further comprising black matrix material superposing at least a portion of said top portion of said reflector.

55. Apparatus according to claim 40, further comprising an optical output path through said substrate for optical energy re-radiated by said re-radiator.

56. Apparatus according to claim 55, wherein said reflector comprises a bottom portion between said medium and said substrate, said bottom portion being at least partially reflective of optical energy received from said waveguide and at least partially transmissive to optical energy re-radiated by said re-radiator.

57. Apparatus according to claim 56, wherein said bottom portion includes a portion which is reflective of optical energy received from said waveguide and also of optical energy re-radiated by said re-radiator, said bottom portion including an aperture which is transmissive to optical energy re-radiated by said re-radiator.

58. Apparatus according to claim 40, wherein said reflector comprises a material which is at least partially transmissive to optical energy re-radiated by said reradiator.

59. Apparatus according to claim 58, wherein said reflector is further partially transmissive to optical energy received from said waveguide.

60. Apparatus according to claim 40, wherein said reflector redirects into said medium substantially all optical energy receive from said waveguide.

61. Apparatus according to claim 40, wherein said re-radiator comprises a luminescent material.

62. Apparatus according to claim 40, wherein said re-radiator comprises an upconversion phosphor.

63. Apparatus according to claim 40, wherein said re-radiator comprises scattering centers.

64. Apparatus according to claim 40, wherein said reflector is shaped to redirect preferentially into a predetermined volume of said medium, smaller than said entire medium, optical energy from said waveguide which is emanating from said medium.

65. Apparatus according to claim 40, wherein said medium is at least partly disposed in at least part of a well in said substrate.

66. Apparatus according to claim 65, wherein said substrate includes an optical core material underlying said well, optical energy coupling out of said optical core material and into said medium in said well.

67. Apparatus according to claim 66, wherein said substrate further includes a top cladding material between said well and said optical core material, said top cladding material being sufficiently thin to permit evanescent coupling of optical energy out of said optical core material and into said medium in said well.

68. Apparatus according to claim 66, wherein said substrate includes a pit disposed to intersect said core material downstream of said well along a propagation direction of said optical energy from said waveguide.

69. Apparatus according to claim 68, wherein said pit is spaced from said well in said propagation direction of said optical energy from said waveguide.

70. Apparatus according to claim 68, further comprising an optical absorber material in said pit.

71. Apparatus according to claim 68, wherein said pit contains a material forming an index of refraction boundary with said core material at said intersection.

72. Apparatus according to claim 66, wherein said reflector includes a portion disposed to intersect said core material downstream of said well along a propagation direction of said optical energy from said waveguide.

73. Apparatus according to claim 65, wherein said substrate has a top surface level, said well extending below said substrate top surface level, and wherein said re-radiator in said medium is disposed at a depth which is at least partially above said substrate top surface level.

74. Apparatus according to claim 73, wherein said re-radiator in said medium is disposed entirely above said substrate top surface level.

75. Apparatus according to claim 73, wherein said medium includes a top volume superposing substantially all of said re-radiator in said medium.

76. Apparatus according to claim 73, wherein said re-radiator is concentrated within a predetermined volume in said medium above substrate top surface level.

77. Apparatus according to claim 76, wherein said predetermined volume is less than 5% of the volume of said medium.

78. Apparatus according to claim 76, wherein said reflector is shaped to redirect into said predetermined volume, optical energy from said waveguide which is emanating from said medium.

79. Apparatus according to claim 40, wherein said medium includes an upper volume and a lower volume separated by said reflector, at least part of said reradiator being disposed in said upper volume, said reflector permitting optical energy received from said waveguide to pass from said lower volume to said upper volume.

80. Apparatus according to claim 40, further comprising a lens disposed to refract said second portion of optical energy.

81. Optical apparatus comprising:
   a material including an integrated optical waveguide, said waveguide having a top cladding layer, said top cladding layer having top and bottom levels in said material;
   a medium including an optical re-radiator disposed to receive optical energy from said waveguide, said optical re-radiator re-radiating optical energy in response to optical energy received from said waveguide, said medium including at least a portion which is above said bottom level of said top cladding layer; and
   a reflector disposed to redirect at least a portion of optical energy emanating from said medium back into said medium.

82. Apparatus according to claim 81, wherein said waveguide further has a core layer below said top cladding layer, said core layer having top and bottom depths in said material, and wherein said material includes a pit extending at least down to said bottom depth of said core layer.

83. Apparatus according to claim 81, wherein said re-radiator in said medium is disposed entirely above said top depth of said top cladding layer.

84. Apparatus according to claim 83, wherein said medium includes a top volume superposing substantially all of said re-radiator in said medium.

85. Apparatus according to claim 83, wherein said medium consists of an upper volume disposed above said top level of said top cladding layer, and a lower volume disposed below said upper volume, and wherein said re-radiator is disposed entirely and uniformly in said upper volume.

86. Apparatus according to claim 83, wherein said medium includes an upper volume disposed above said top level of said top cladding layer, and wherein said re-radiator is concentrated within a predetermined volume which is smaller than and entirely within said upper volume.

87. Apparatus according to claim 86, wherein said reflector is shaped to redirect preferentially into said predetermined volume, optical energy from said waveguide which is emanating from said medium.

88. Apparatus according to claim 81, wherein said medium has a top surface, and wherein said reflector includes a top portion at least partially covering said top surface of said medium.

89. Apparatus according to claim 88, wherein said top portion of said reflector includes a top aperture transmissive to optical energy re-radiated by said reradiator.

90. Apparatus according to claim 81, wherein said reflector includes a bottom portion at least partially underlying said medium.

91. Apparatus according to claim 90, wherein said bottom portion of said reflector includes a bottom aperture transmissive to optical energy re-radiated by said re-radiator.

92. Apparatus according to claim 81, wherein said reflector includes a first aperture through which said medium receives optical energy from said waveguide, and further includes a second aperture, different from said first aperture, which is transmissive to optical energy re-radiated by said re-radiator.

93. Apparatus according to claim 81, wherein said re-radiator comprises a luminescent substance.

94. Apparatus according to claim 81, wherein said re-radiator comprises an upconversion phosphor.

95. Apparatus according to claim 81, wherein said re-radiator comprises scattering centers.

96. Apparatus according to claim 81, further comprising a lens disposed to refract optical energy re-radiated by said re-radiator.

97. Optical apparatus for use with input optical energy, comprising:
   a medium including an optical re-radiator, said optical re-radiator re-radiating optical energy in response to said input optical energy;
   a sidewall reflector substantially surrounding a confinement region in a plane below said re-radiator, said sidewall reflector having an input path for receiving said input optical energy into said confinement region and directed within said plane, said sidewall reflector being oriented to redirect back into said confinement region, optical energy directed outwardly from said confinement region, optical energy being transferrable from said confinement region into said re-radiator.

98. Apparatus according to claim 97, wherein said optical re-radiator comprises a luminescent material.

99. Apparatus according to claim 97, wherein said optical re-radiator comprises a medium consisting of scattering centers.

100. Apparatus according to claim 97, further comprising an input optical waveguide carrying said input optical energy, said waveguide having a core layer and top and bottom cladding layers, at least said core layer extending into said confinement region and at least partially defining said input path.

101. Apparatus according to claim 100, further comprising a top cladding material superposing said core layer in said confinement region below said re-radiator, said top cladding material being sufficiently thin to permit evanescent coupling of optical energy out of said confinement region and into said medium.

102. Apparatus according to claim 97, wherein said confinement region is below said medium, further comprising a top cladding material superposing said core layer in said confinement region below said medium, said top cladding material being sufficiently thin to permit evanescent coupling of optical energy out of said confinement region and into said medium.

103. Apparatus according to claim 102, further comprising a trench substantially surrounding said confinement region except for said input path, said sidewall reflector being formed on a surface of said trench.

104. Apparatus according to claim 103, further comprising a ridge of top cladding material substantially surrounding said confinement region and substantially surrounded by said trench, said ridge of top cladding material being thicker than said top cladding material superposing said core layer in said confinement region below said re-radiator.

105. Apparatus according to claim 103, further comprising an optical absorber disposed in said trench.

106. Apparatus according to claim 103, further comprising an optical reradiator disposed in said trench.

107. Apparatus according to claim 97, further comprising a reflector superposing said medium and redirecting at least a portion of optical energy emanating from said medium back into said medium.

108. Apparatus according to claim 107, wherein optical energy re-radiated from said re-radiator is permitted to escape said medium primarily in a direction not parallel to said plane.

109. Apparatus according to claim 107, wherein said reflector has an aperture which is transmissive to optical energy re-radiated by said re-radiator.

110. Apparatus according to claim 97, wherein said sidewall reflector forms a circle having an input aperture therein for said input path, said input optical energy entering said confinement region with a propagation direction that is off-center with respect to said circle.

111. Apparatus according to claim 97, further comprising a baffle reflector disposed and oriented to reduce optical energy emission from said confinement region back through said input aperture.

* * * * *

UNITED STATES PATENT AND TRADEMARK OFFICE
CERTIFICATE OF CORRECTION

PATENT NO. : 6,208,791 B1
DATED : March 27, 2001
INVENTOR(S) : William K. Bischel et al.

Page 1 of 1

It is certified that error appears in the above-identified patent and that said Letters Patent is hereby corrected as shown below:

<u>Column 1,</u>
Line 3, insert the following text:

-- STATEMENT REGARDING FEDERALLY SPONSORED RESEARCH OR DEVELOPMENT
    This invention was made with Government support under contract no. N61331-96-C-0036 awarded by the Naval Surface Warfare Center. The Government has certain rights in the invention. --

Signed and Sealed this

Thirtieth Day of April, 2002

Attest:

Attesting Officer

JAMES E. ROGAN
*Director of the United States Patent and Trademark Office*